(12) United States Patent
Kang et al.

(10) Patent No.: US 10,853,003 B2
(45) Date of Patent: Dec. 1, 2020

(54) METHOD OF MANAGING PRINT JOBS BASED ON JOB IDENTIFICATION OF THE PRINT JOBS IN PRINTING SYSTEM AND APPARATUS FOR PERFORMING THE SAME

(71) Applicant: BIXOLON Co., Ltd., Seongnam-si (KR)

(72) Inventors: Chan Wook Kang, Yongin-si (KR); Hong Ju Jin, Yongin-si (KR)

(73) Assignee: BIXOLON CO., LTD., Seongnam-si (KR)

( * ) Notice: Subject to any disclaimer, the term of this patent is extended or adjusted under 35 U.S.C. 154(b) by 0 days.

(21) Appl. No.: 16/199,142

(22) Filed: Nov. 24, 2018

(65) Prior Publication Data
US 2019/0163411 A1    May 30, 2019

(30) Foreign Application Priority Data

Nov. 28, 2017  (KR) .................. 10-2017-0160989
Dec. 27, 2017  (KR) .................. 10-2017-0181477

(51) Int. Cl.
*G06F 3/12*     (2006.01)
*H04N 1/00*     (2006.01)

(52) U.S. Cl.
CPC ............ *G06F 3/121* (2013.01); *G06F 3/1205* (2013.01); *G06F 3/1234* (2013.01); *G06F 3/1274* (2013.01); *G06F 3/1285* (2013.01); *H04N 1/00029* (2013.01); *H04N 1/00037* (2013.01)

(58) Field of Classification Search
None
See application file for complete search history.

(56) References Cited

U.S. PATENT DOCUMENTS

| | | | |
|---|---|---|---|
| 9,141,323 B1* | 9/2015 | Ono | G06F 3/121 |
| 2005/0018235 A1* | 1/2005 | Shikata | G06F 3/1207 358/1.14 |
| 2010/0265542 A1* | 10/2010 | Horiyama | G06F 3/121 358/1.15 |
| 2016/0371039 A1* | 12/2016 | Mizuno | G06F 3/1215 |

* cited by examiner

*Primary Examiner* — Lennin R Rodriguezgonzalez
(74) *Attorney, Agent, or Firm* — KORUS Patent, LLC; Seong Il Jeong

(57) ABSTRACT

Disclosed herein are a method and apparatus for performing print jobs in a printing system including a host device and a printing device. The method of performing print jobs in a printing system including a host device and a printing device includes: requesting printing while transmitting print data and identifications (IDs) corresponding to one or more print jobs, included in a job list, to the printing device; if an identification (ID) corresponding to at least one completed print job is received from the printing device, updating the job list by deleting a print job corresponding to the received ID from the job list; if an error has occurred in the printing system, determining whether the error has been resolved; and if it is determined that the error has been resolved, resuming printing.

15 Claims, 27 Drawing Sheets

METHOD OF MANAGING PRINT JOBS BASED ON JOB IDENTIFICATION OF THE PRINT JOBS IN PRINTING SYSTEM AND APPARATUS FOR PERFORMING THE SAME

CROSS-REFERENCE TO RELATED APPLICATION

This application claims the benefit of Korean Patent Application No. 10-2017-0160989 filed on Nov. 28, 2017, and Korean Patent Application No. 10-2017-0181477 filed on Dec. 27, 2017, which is hereby incorporated by reference herein in its entirety.

BACKGROUND

1. Technical Field

Embodiments disclosed in the present specification relate to methods and apparatuses for performing print jobs in a printing system including a host device and a printer.

2. Description of the Related Art

In general, printing systems include a host device and a printer, and operate in such a manner that the host device requests printing from the printer while transmitting print data to the printer. If an error abruptly occurs in a printing system having such a structure, a problem may arise in that print data transmitted from a host device to a printer is lost or in that an inconsistency occurs between a list of print jobs stored in the host device and a list of print jobs stored in the buffer of the printer.

In connection with this, Korean Patent No. 10-0363160, which is a related art document, discloses technology in which if an error occurs in any one of a plurality of printers in an environment where the plurality of printers is connected over a network, a print job waiting in the printer where the error occurs is transmitted to another printer.

Meanwhile, the above-described related art corresponds to technical information that has been possessed by the present inventor in order to contrive the present invention or that has been acquired during a process of contriving the present invention, and cannot be necessarily viewed as well-known technology that has been known to the public before the filing of the present application.

SUMMARY

Embodiments disclosed in the present specification provide methods and apparatuses that, if an error had occurred and has been resolved in a printing system including a host device and a printer, prevent print data, transmitted from the host device to the printer, from being lost and also resolve an inconsistency between the job list of the host device and the job list of the printer.

According to an embodiment, there is provided a method of performing print jobs in a printing system including a host device and a printing device, the method including: requesting printing while transmitting print data and identifications (IDs) corresponding to one or more print jobs, included in a job list, to the printing device; if an identification (ID) corresponding to at least one completed print job is received from the printing device, updating the job list by deleting a print job corresponding to the received ID from the job list; if an error has occurred in the printing system, determining whether the error has been resolved; and if it is determined that the error has been resolved, resuming printing.

According to another embodiment, there is provided a computer-readable storage medium having stored thereon a computer program that, when executed by a processor, causes the processor to execute a method of performing print jobs in a printing system including a host device and a printing device, the method including: requesting printing from the printing device while transmitting print data and identifications (IDs) corresponding to one or more print jobs, included in a job list, to the printing device; if an identification (ID) corresponding to at least one completed print job is received from the printing device, updating the job list by deleting a print job corresponding to the received ID from the job list; if an error has occurred in the printing system, determining whether the error has been resolved; and if it is determined that the error has been resolved, resuming the printing.

According to still another embodiment, there is provided a host device included in a printing system, the host device including: a communication unit configured to perform communication with a printing device; a storage unit configured to that store a job list; and a control unit configured to manage the job list based on identifications (IDs) corresponding to one or more print jobs included in the job list, wherein the control unit requests printing while transmitting print data and IDs corresponding to one or more print jobs, included in the job list, to the printing device, updates the job list by deleting a print job corresponding to a received identification (ID) if the ID corresponding to at least one completed print job is received from the printing device, determines whether an error has been resolved if the error has occurred in the printing system, and resumes printing based on the updated job list if it is determined that the error has been resolved.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Various embodiments will be described in detail below with reference to the accompanying drawings. The following embodiments may be modified and practiced in various different forms. In order to more clearly describe the features of the embodiments, detailed descriptions of items well known to those having ordinary knowledge in the art to which the embodiments pertain will be omitted. Furthermore, parts unrelated to descriptions of the embodiments will be omitted in the accompanying drawings, and the same reference symbols will be assigned to the same parts throughout the specification.

Throughout the specification, when a component is described as being "connected to another component," this includes not only a case where they are "directly connected to each other" but also a case where they are "connected to each other with a third component interposed therebetween." Furthermore, when a component is described as "including" another component, this means that a third component is not excluded but may be further included, unless particularly described to the contrary.

Figure 1:
FIG. 1 is a view showing a printing system according to a first embodiment.

FIG. 1 is a view showing a printing system 10 according to an embodiment. Referring to FIG. 1, the printing system 10 according to the present embodiment may include a host device 100 and a printer 200 that communicate with each other in a wired/wireless manner.

Although the printing system 10 is illustrated as including the single host device 100 and the single printer 200 in FIG. 1, the printing system 10 may include a plurality of host devices 100 and a single printer 200, a single host device 100 and a plurality of printers 200, or a plurality of host devices 100 and a plurality of printers 200.

The host device 100 included in the printing system 10 may be one of various types of electronic devices capable of wired/wireless communication, such as a smartphone, a tablet personal computer (PC), a desktop, a notebook, a point-of-sale (POS) device, etc. Furthermore, the printer 200 included in the printing system 10 may include not only a common printer but also various other printing devices, such as a combined printer, scanner and fax machine, a POS printer, a kiosk for outputting prints, etc.

If a print event occurs, the host device 100 requests printing from the printer 200. The host device 100 may manage a job list including one or more print jobs, and may allocate identifications (IDs) to the respective print jobs. In the following, each of the IDs allocated to the print jobs will be referred to as the "job ID." Meanwhile, the print jobs may be defined by dividing the overall print data, included in the job list, on a page, document, or block basis.

If the host device 100 requests printing from the printer 200 while transmitting the print data and job IDs of the print jobs, included in the job list, to the printer 200, the printer 200 stores the received print jobs (the print data and the job IDs) in the buffer thereof, and sequentially performs the received print jobs. In other words, the printer 200 stores a job list including the print jobs, received from the host device 100, in the buffer thereof, and manages the job list.

If an error occurs in the printing system 10 while the printer 200 is performing printing, the data (the print data and job ID) of at least one print job that has not yet been completed among the print jobs stored in the buffer of the printer 200 may be deleted. Furthermore, if the printer 200 continues to perform printing even after an error has occurred in the printing system 10, an inconsistency may occur between the job list stored in the host device 100 and the job list stored in the buffer of the printer 200.

Accordingly, the following embodiments propose methods by which the host device 100 manages a job list based on the job IDs of print jobs, thereby preventing print data from being lost and also resolving an inconsistency between the job list of the host device 100 and the job list of the printer 200.

Figure 2:
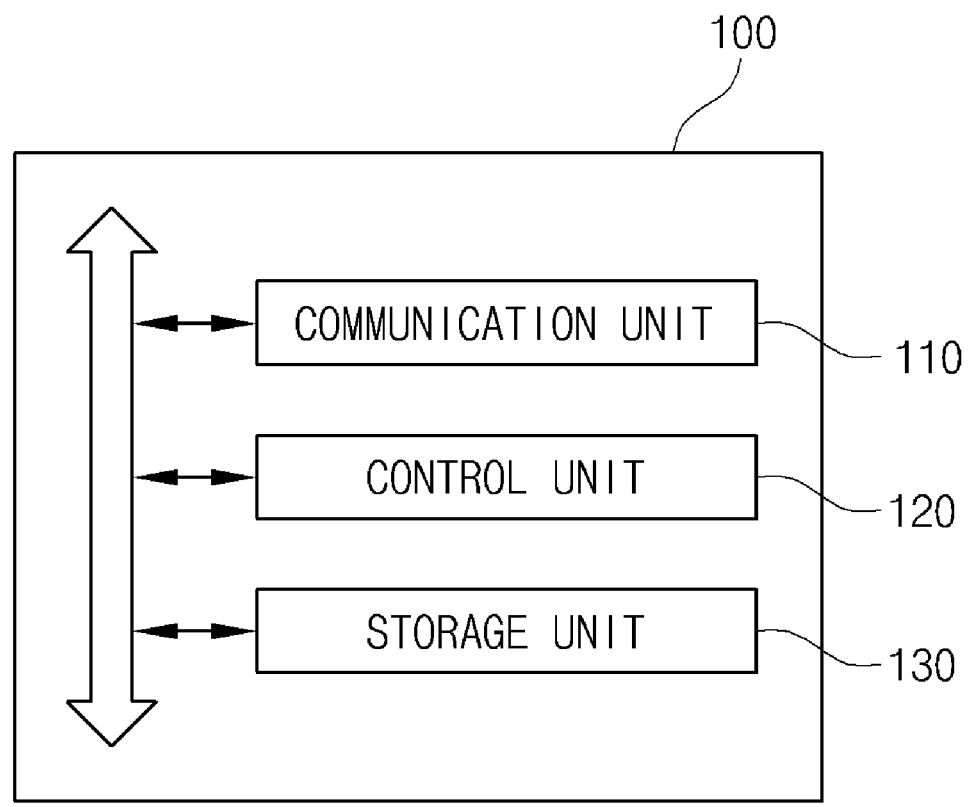
FIG. 2 is a view showing the configuration of a host device according to the first embodiment.

FIG. 2 is a view showing the configuration of the host device 100 according to the present embodiment. Referring to FIG. 2, the host device 100 according to the present embodiment may include a communication unit 110, a control unit 120, and a storage unit 130.

The communication unit 110 communicates with the printer included in the printing system. For this purpose, the communication unit 110 may include a communication module that supports at least one of various types of wired/wireless communication methods. For example, the communication unit 110 may include a communication chipset, a communication port, etc.

The control unit 120 includes at least one processor, such as a central processing unit (CPU) or the like, and controls the overall operation of the host device 100. In particular, the control unit 120 allocates job IDs to respective print jobs included in a job list, and manages the job list based on the job IDs. A specific method by which the control unit 120 manages a job list based on job IDs will be described in detail below with reference to other drawings.

The storage unit 130 may store various types of programs and data. In particular, the storage unit 130 may store print data corresponding to print jobs, and may also store a job list including the job IDs of scheduled print jobs.

A method by which the host device manages print jobs if an error had occurred and has been resolved in the printing system will be described in detail below with reference to FIGS. 3 to 7.

Figure 3:
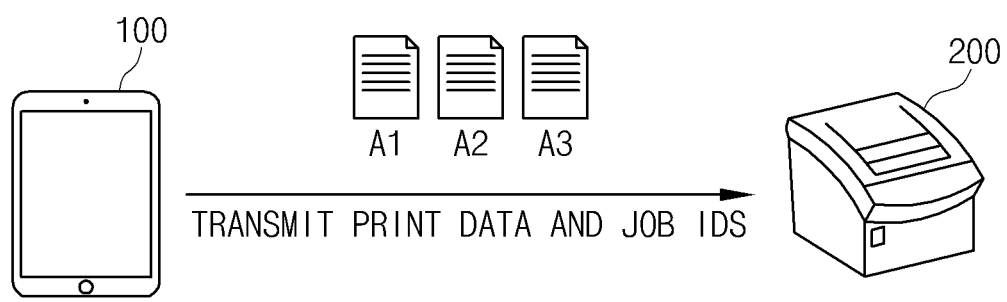
FIGS. 3 to 7 are views illustrating a method by which the host device manages print jobs if an error had occurred and has been resolved in the printing system according to the first embodiment.

FIG. 3 shows a situation in which the host device 100 requests printing from the printer 200 while transmitting the print data and job IDs of one or more print jobs to the printer 200. Referring to FIG. 3, the job list of the host device 100 includes three print jobs, and the job IDs of the print jobs are A1, A2, and A3, respectively.

As described above, the control unit 120 of the host device 100 may allocate job IDs to the respective print jobs, and may manage the job list based on the job IDs. Furthermore, the print jobs may refer to print data divided on a page, document or block basis.

The host device 100 requests printing from the printer 200 while transmitting the print data and job IDs "A1," "A2" and "A3" of the print jobs, included in the job list, to the printer 200. The printer 200 may store the print data and job IDs of the received print jobs in the buffer thereof, and may sequentially perform printing. In other words, the job list including the print jobs and received from the host device 100 may be stored in the buffer of the printer 200.

Figure 4:
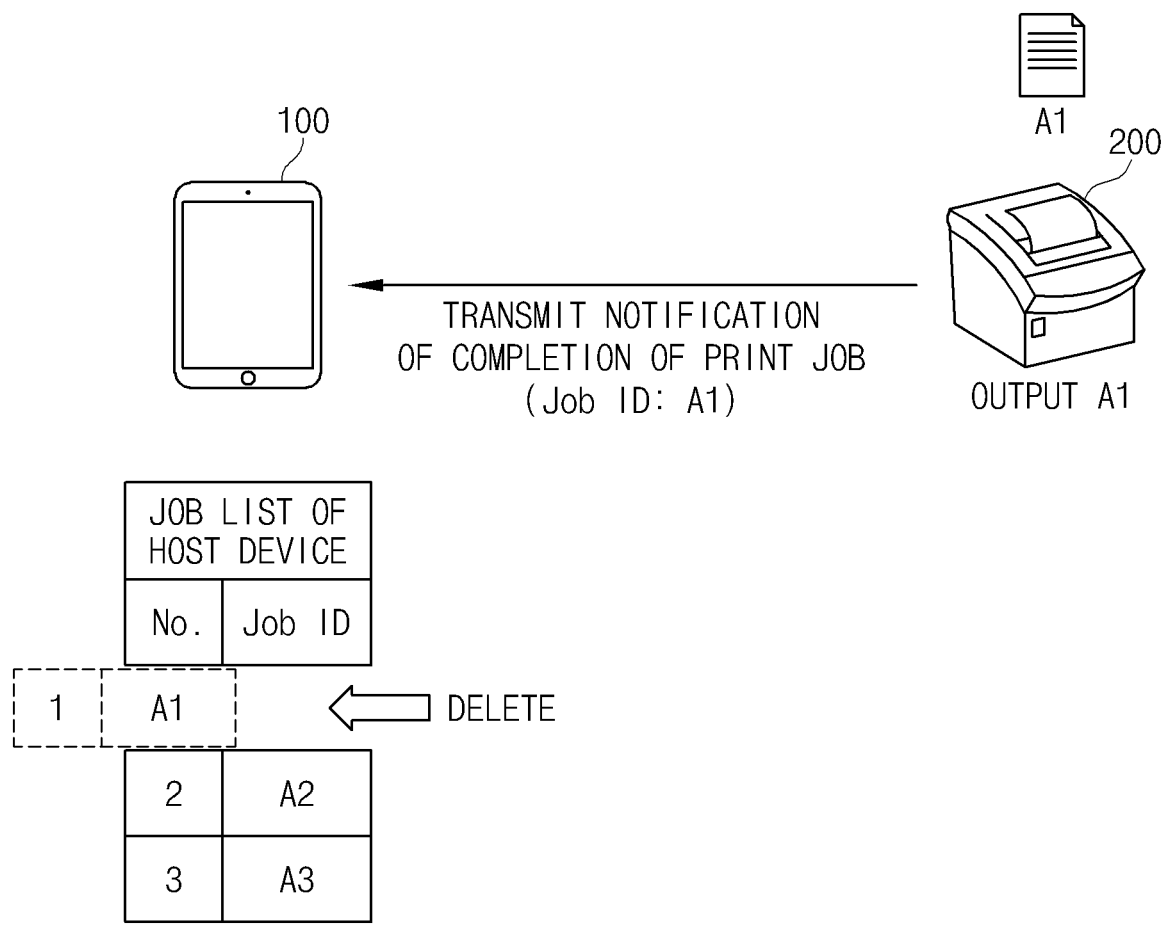

FIG. 4 shows a situation in which the job list of the host device 100 is updated if the printer 200 completes a print job. Referring to FIG. 4, if the printer 200 completes at least one print job, the printer 200 transmits a job ID corresponding to the completed print job to the host device 100. In FIG. 4, as the printer 200 completes a print job having a job ID of A1, the printer 200 notifies the host device 100 of the completion of the print job while transmitting "A1."

Meanwhile, a condition under which the printer 200 determines that a print job is completed may be set in various manners. For example, the printer 200 may determine that a specific print job has been completed if a print corresponding to the corresponding print job is output via the output unit of the printer 200. Alternatively, the printer 200 may determine that a specific print job has been completed only if a taken sensor provided in the output unit detects the fact that a user has taken the output.

If the host device 100 receives the job ID of the completed print job from the printer 200, the host device 100 updates the job list by deleting a print job corresponding to the received job ID from the job list. In FIG. 4, since the host device 100 receives "A1" from the printer 200, the host device 100 deletes a print job corresponding to "A1" from the job list.

If the printer 200 transmits notification of the completion of the print job to the host device 100, the printer 200 may operate in a synchronous or asynchronous manner. For example, if the printer 200 operates in a synchronous manner, the printer 200 transmits the job ID of a single completed print job to the host device 100 whenever the single print job is completed. In contrast, if the printer 200 operates in an asynchronous manner, the printer 200 may periodically transmit the job IDs of completed print jobs to the host device 100, may transmit the job IDs of a preset number of completed print jobs to the host device 100 after the preset number of print jobs have been completed, or may transmit the job IDs of completed print jobs to the host device 100 if all the print jobs stored in the buffer are completed.

As described above, the host device 100 manages the job list based on the job IDs of the print jobs, thereby rapidly incorporating a state in which one or more print jobs are completed in the printer 200 into the job list.

Figure 5:
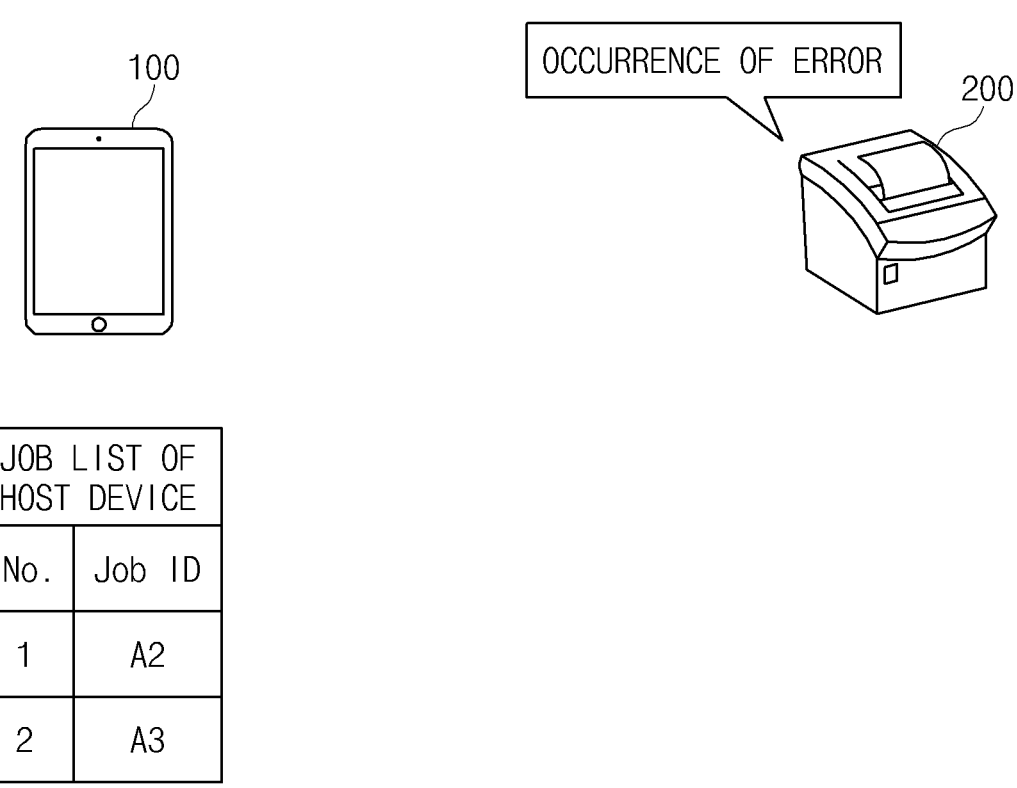

FIG. 5 shows a state in which an error has occurred in the printing system. If an error has occurred in the printing system, the host device 100 may become aware that the error has occurred in the printing system. The types of errors that may occur in the printing system are various. For example, such an error may be a situation in which the power of the printer 200 is cut off or a situation in which the printer 200 is out of paper. Furthermore, such an error may be a situation in which the cover of the printer 200 is opened or a situation in which a paper jam occurs in the printer 200. Moreover, such an error may be a situation in which a communication problem occurs in at least one of the host device 100 and the printer 200 or a situation in which a problem occurs in a communication network constituting part of the printing system and thus the communication between the host device 100 and the printer 200 is interrupted.

The host device 100 may determine that an error has occurred in the printing system by using various methods. The host device 100 may determine that an error has occurred in the printing system if an attempt to communicate with the printer 200 fails. For example, the host device 100 may consider that communication with the printer 200 fails if any data has not been received from the printer 200 within a preset predetermined period, and may then determine that an error has occurred in the printing system. Alternatively, the host device 100 may determine that an error has occurred in the printing system if an error message is received from the printer 200.

If an error in which the power of the printer 200 is cut off occurs, all of print data and one or more job IDs stored in the buffer of the printer 200 are deleted. Furthermore, if the printer 200 is out of paper, the cover of the printer 200 is opened, or a paper jam occurs in the printer 200, all of print data and one or more job IDs stored in the buffer may be deleted in order to prevent the data from being entangled with each other.

As described above, if data stored in the buffer of the printer 200 is deleted due to the occurrence of an error, the print data of one or more print jobs that are not completed may be lost, with the result that at least part of the print jobs may be omitted even if the printing of the printing jobs is resumed after the error has been resolved. In order to prevent print data from being lost, the host device 100 may update a job list by incorporating a print job completion state immediately before the occurrence of an error into the job list in real time, and may resume the printing of a print job based on the updated job list if the error occurs and is then resolved. An embodiment of this is illustrated in FIG. 6.

Figure 6:
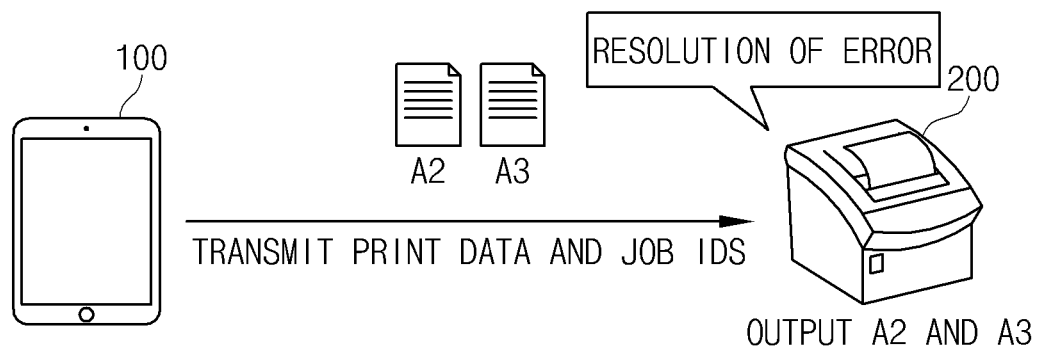

FIG. 6 shows a situation in which the printing of a print job is resumed after an error has been resolved in the printing system. It is assumed that print jobs stored in the buffer of the printer 200 have been all deleted due to the occurrence of the error. If it is determined that the error having occurred in the printing system has been resolved, the host device 100 requests printing from the printer 200 while transmitting the print data and job IDs of print jobs, included in the job list, to the printer 200.

In this case, a method by which the host device 100 determines whether an error has been resolved is the same as follows. The host device 100 may periodically determine whether an error has been resolved. For example, if an error in which communication with the printer 200 is interrupted occurs, the host device 100 may periodically attempt to access the printer 200, and may determine that the error has been resolved if the access to the printer 200 is successful. Alternatively, if the host device 100 receives an error message from the printer 200, the host device 100 may periodically inquire of the printer 200 about whether an error has been resolved, and may determine that the error has been resolved if a response indicating that the error has been resolved is received from the printer 200. Alternatively, the host device 100 may determine whether an error having occurred in the printing system has been resolved by using various other methods.

Since a print job performance state before the occurrence of the error in the printing system has been incorporated into the job list of the host device 100, as described in conjunction with FIG. 4, it may be possible to minimize the unnecessary redundant performance of a print job while preventing print data from being lost.

Meanwhile, referring back to FIG. 5, even if an error occurs in the printing system, the printer 200 may normally perform printing while maintaining data stored in the buffer. For example, if there occurs an error in which communication between the host device 100 and the printer 200 is simply interrupted, the printer 200 may continue to output print data stored in the buffer after the communication has been interrupted. In this case, a print job performance state is not incorporated into the job list of the host device 100, and thus a problem arises in that an inconsistency occurs between the job list of the host device 100 and the job list of the printer 200. An embodiment intended to solve this problem is illustrated in FIG. 7.

Figure 7:
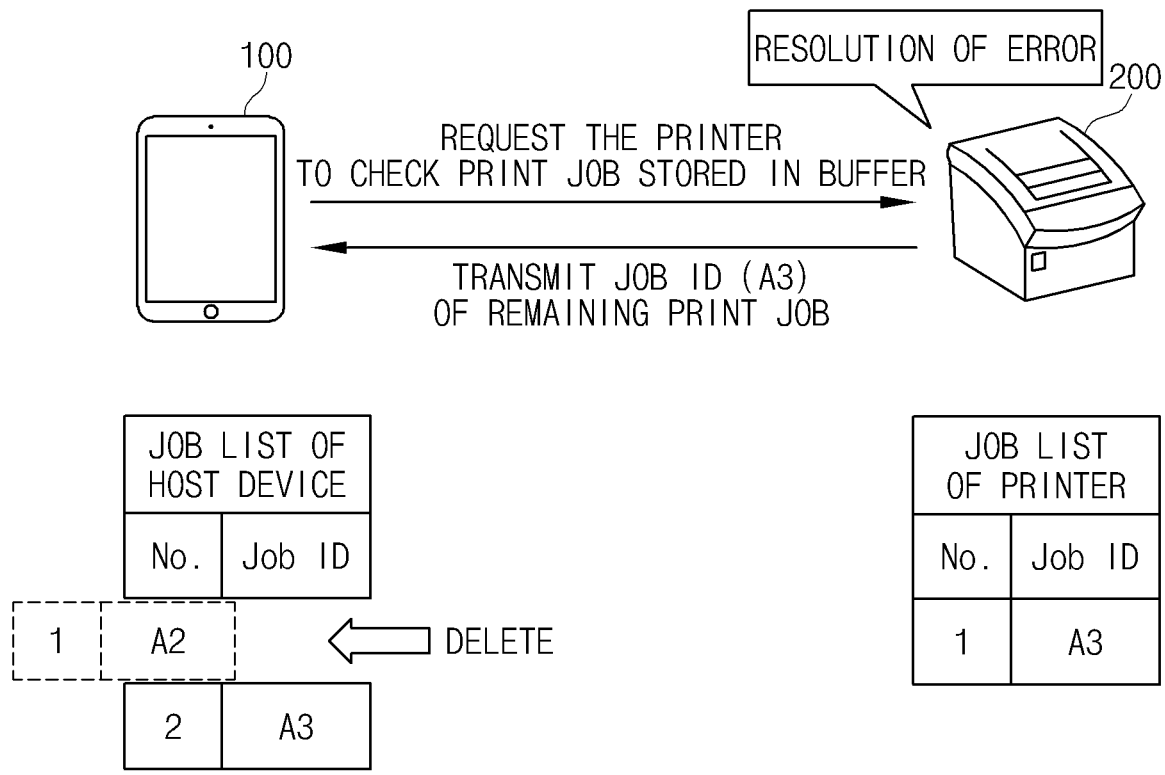

FIG. 7 is a view illustrating a method of updating the job list of the host device based on a job list stored in the buffer of the printer after an error of the printing system has been resolved. Referring to FIG. 7, if it is determined that an error of the printing system has been resolved, the host device 100 requests the printer 200 to check a print job stored in the buffer of the printer 200. In this case, a method by which the host device 100 determines whether the error of the printing system has been resolved is the same as described in conjunction with FIG. 6.

The printer 200 that has received the request transmits the job ID of at least one print job, stored in the buffer, to the host device 100. Since a completed print job is deleted from the buffer of the printer 200, only a print job that is not completed is stored in the buffer of the printer 200.

In FIG. 7, since the checking request is received from the host device 100 in a state in which a print job having a job ID of "A3" has been stored in the buffer of the printer 200, the printer 200 transmits "A3" to the host device 100. The host device 100 deletes print jobs from the job list except for the print job corresponding to the job ID of "A3" received from the printer 200. As described above, the print job performance state in the printer 200 after the occurrence of the error is incorporated by updating the job list of the host device 100 based on the job list stored in the buffer of the printer 200 after the error of the printing system has been resolved, thereby resolving an inconsistency between the job lists of the two devices.

A process of performing print jobs in the printing system according to the present embodiment will be described below with reference to FIGS. 8 to 11.

Figure 8:
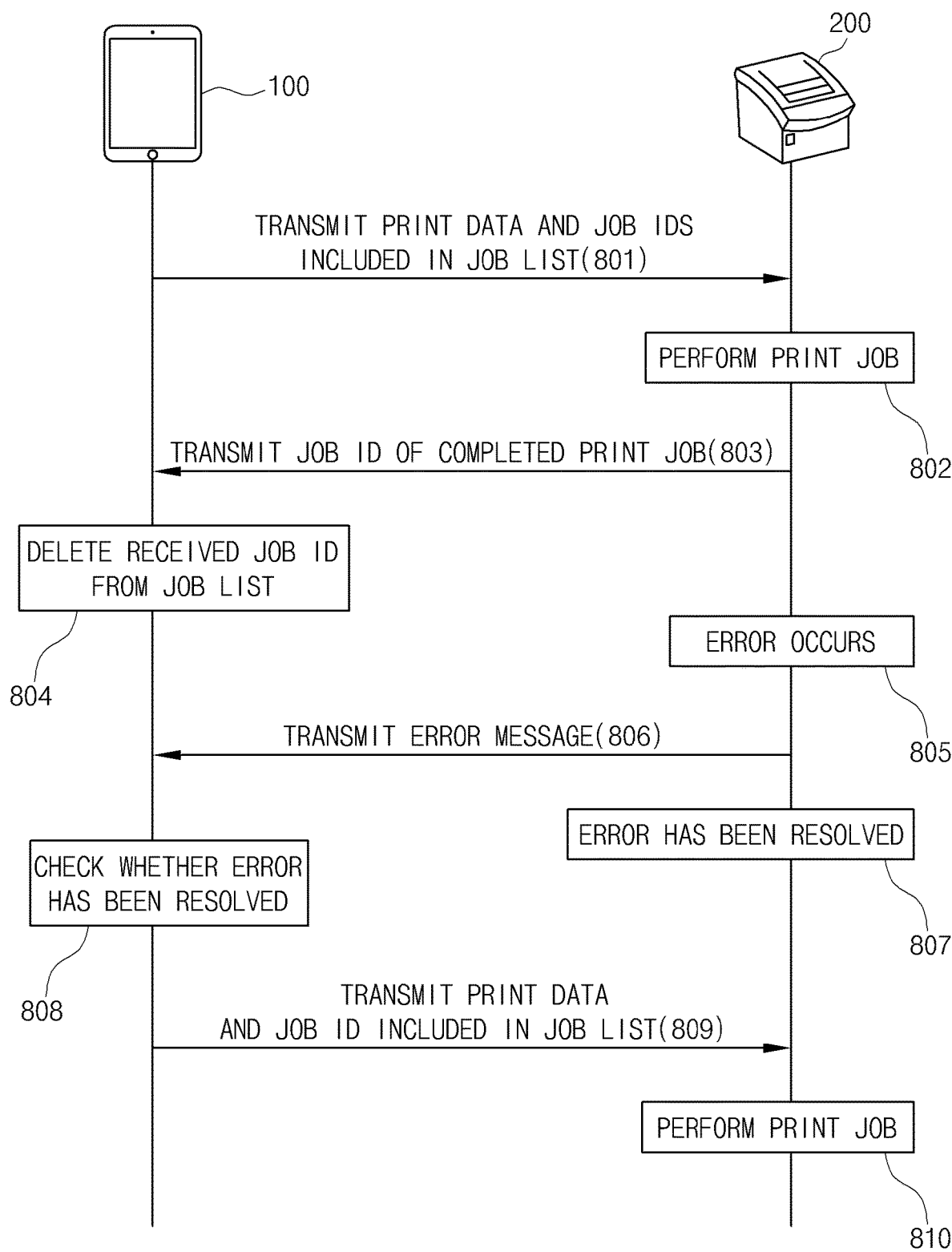
FIGS. 8 to 11 are views illustrating a process of performing print jobs in the printing system according to the first embodiment.

Referring to FIG. 8, if the host device 100 transmits print data and job IDs, included in a job list, to the printer 200 at step 801, the printer 200 performs a print job at step 802.

If the print job is completed, the printer 200 transmits the job ID of the completed print job to the host device 100 at step 803. If the job ID of the completed print job is received from the printer 200, the host device 100 updates the job list by deleting a print job corresponding to the received job ID from the job list at step 804.

If an error occurs in the printer 200 at step 805, the printer 200 transmits an error message to the host device 100 at step 806.

The error having occurred in the printer 200 has been resolved at step 807, and the host device 100 becomes aware that the error having occurred in the printer 200 has been resolved at step 808. For example, at step 808, it may be determined that the error has been resolved in such a manner that the host device 100 periodically inquires of the printer 200 about whether an error has been resolved and receives a response indicating that the error has been resolved from the printer 200.

If it is determined that the error has been resolved, the host device 100 request printing from the printer 200 while transmitting the print data and job ID of a print job, included in the job list updated at step 804, to the printer 200 at step 809, and the printer 200 performs the received print job at step 810.

Meanwhile, although the embodiment in which the host device 100 detects the occurrence of an error by receiving an error message from the printer 200 is shown in FIG. 8, there is a case where an error message may not be received from the printer 200 even if an error occurs in the printing system. For example, if the power of the printer 200 is cut off or communication between the host device 100 and the printer 200 is interrupted, the host device 100 may not receive an error message from the printer 200. An embodiment related to this situation is shown in FIG. 9.

Figure 9:
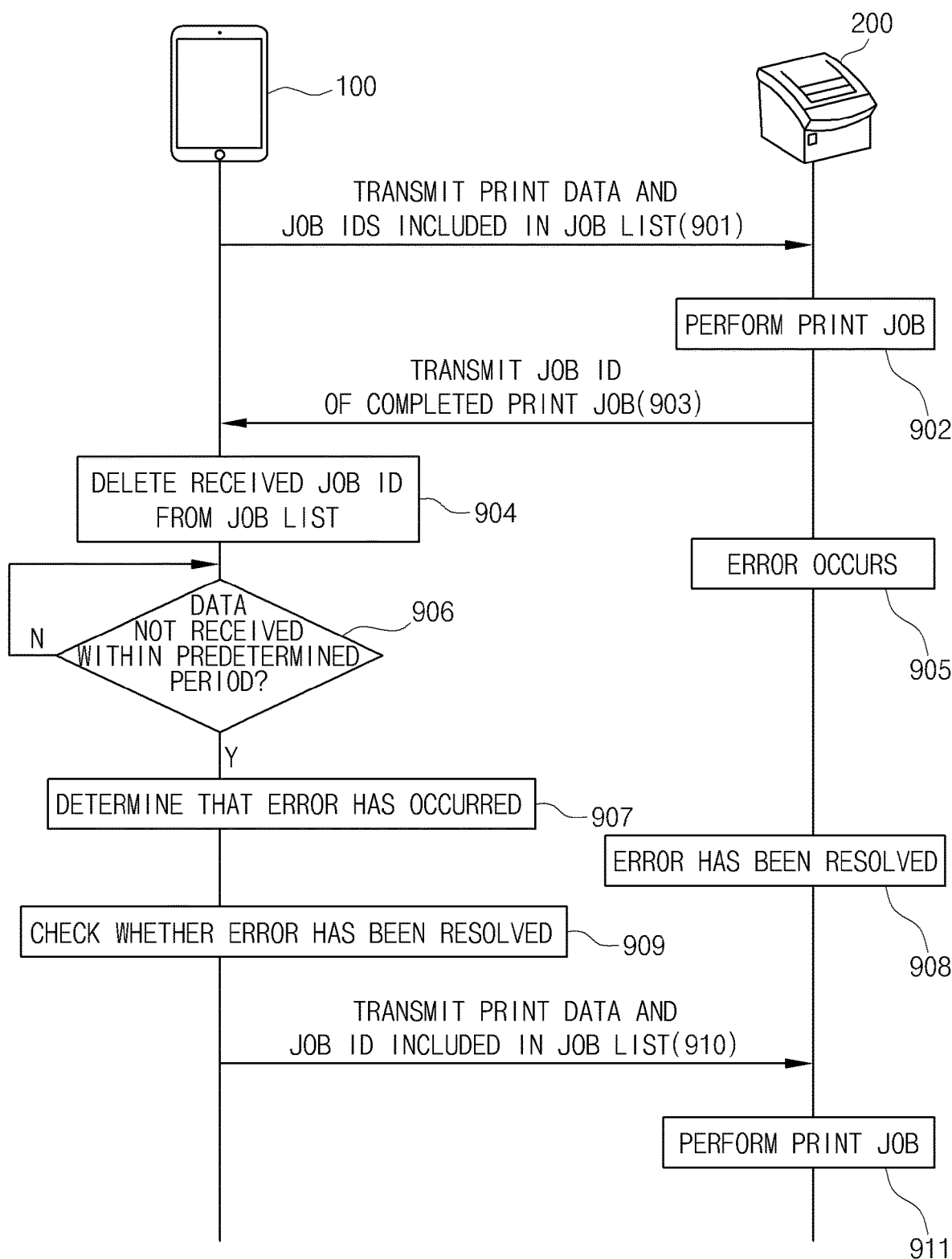

Since steps 901 to 905 of FIG. 9 are the same as the above-described steps 801 to 805 of FIG. 8, redundant descriptions thereof will be omitted.

Referring to FIG. 9, at step 906, the host device 100 determines whether data has been received from the printer 200 within a preset predetermined period. If, as a result of the determination, it is determined that data has not been received from the printer 200 within the predetermined period, the process proceeds to step 907, at which the host device 100 determines that an error has occurred in the printing system. In other words, if the host device 100 fails in an attempt to communicate with the printer 200, the host device 100 determines that an error has occurred in the printing system.

If an error has been resolved at step 908, the host device 100 may determine that the error has been resolved at step 909. In this case, a method by which the host device 100 determines that the error has been resolved at step 909 may be, for example, to periodically attempt to access the printer 200 and determine that the error has been resolved if the access is successful.

If it is determined that the error has been resolved, the host device 100 requests printing from the printer 200 while transmitting the print data and job ID of at least one print job, included in the job list updated at step 904, to the printer 200 at step 910, and the printer 200 performs the received print job at step 911.

Now a process of resuming the performance of a print job if communication between the host device 100 and the printer 200 is interrupted and then resumed will be described with reference to FIGS. 10 and 11.

Figure 10:
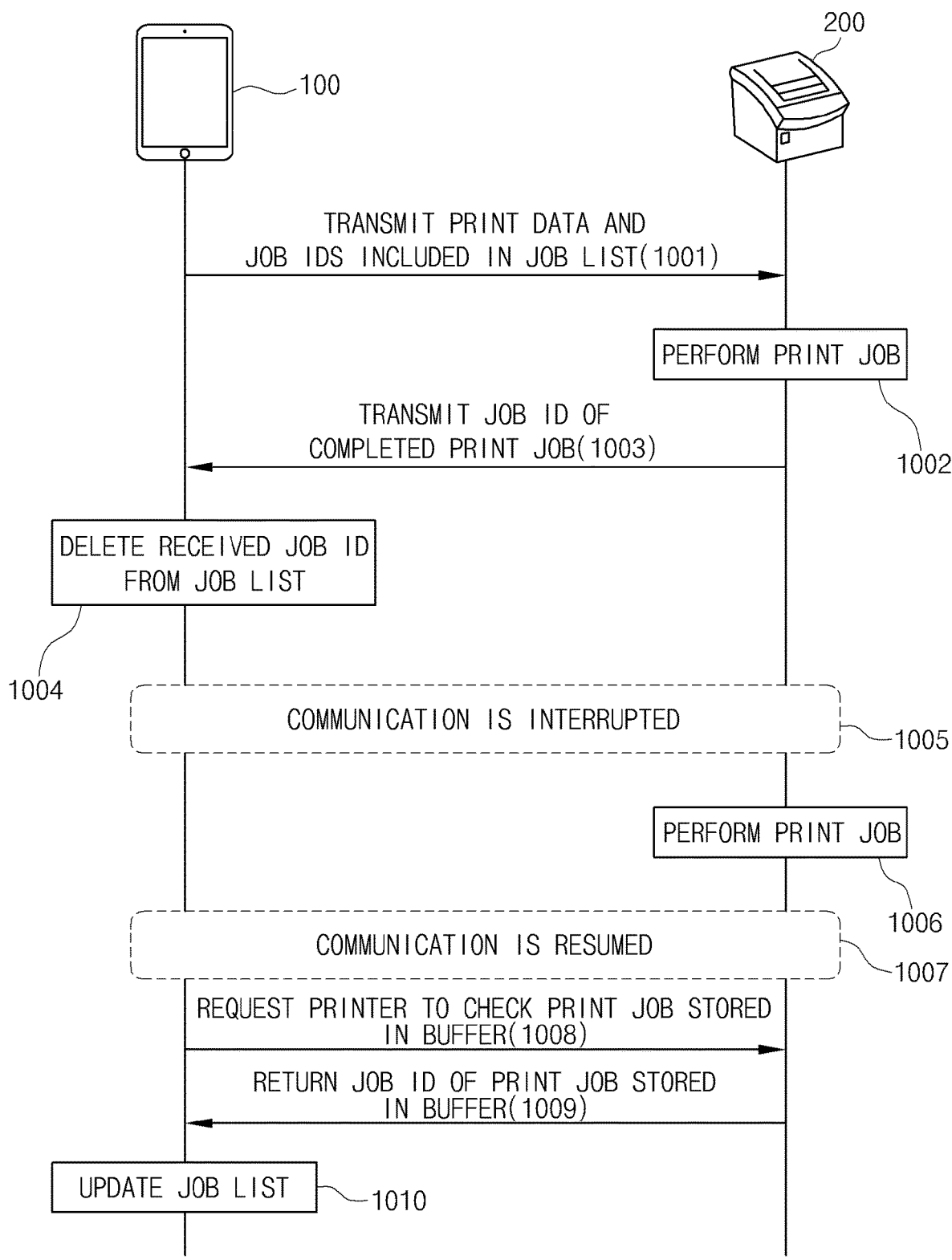

Since steps 1001 to 1004 of FIG. 10 are the same as the above-described steps 801 to 804 of FIG. 8, redundant descriptions thereof will be omitted.

Referring to FIG. 10, after communication between the host device 100 and the printer 200 has been interrupted at step 1005, the printer 200 performs a print job at step 1006. In other words, the printer 200 may normally perform a print job stored in the buffer in a situation in which communication with the host device 100 has been interrupted.

As described above, if the print job is completed in a situation in which communication with the host device 100 has been interrupted, the printer 200 may not transmit the job ID of the completed print job to the host device 100, and thus the details of the completed print job are not incorporated into the job list of the host device 100. Accordingly, an inconsistency occurs between the job list stored in the host device 100 and the job list stored in the buffer of the printer 200.

If communication between the host device 100 and the printer 200 is resumed at step 1007, the host device 100 transmits a request for the checking of a print job stored in the buffer of the printer 200 to the printer 200 at step 1008. At step 1009, the printer 200 returns the job ID of a print job, stored in the buffer, to the host device 100. At step 1010, the host device 100 re-updates the job list based on the received job ID. For example, the host device 100 may delete print jobs stored in the job list except for a print job corresponding to the job ID received at step 1009.

From the embodiment shown in FIG. 10, there may be expected the advantage of preventing a print job from being redundantly performed by incorporating the details of the print job, performed during the interruption of communication, into the job list of the host device 100. Meanwhile, even if some print job is redundantly performed, all print jobs included in the job list before communication is interrupted may be performed in order to thoroughly prevent the print job from being omitted. An embodiment related to this is shown in FIG. 11.

Figure 11:
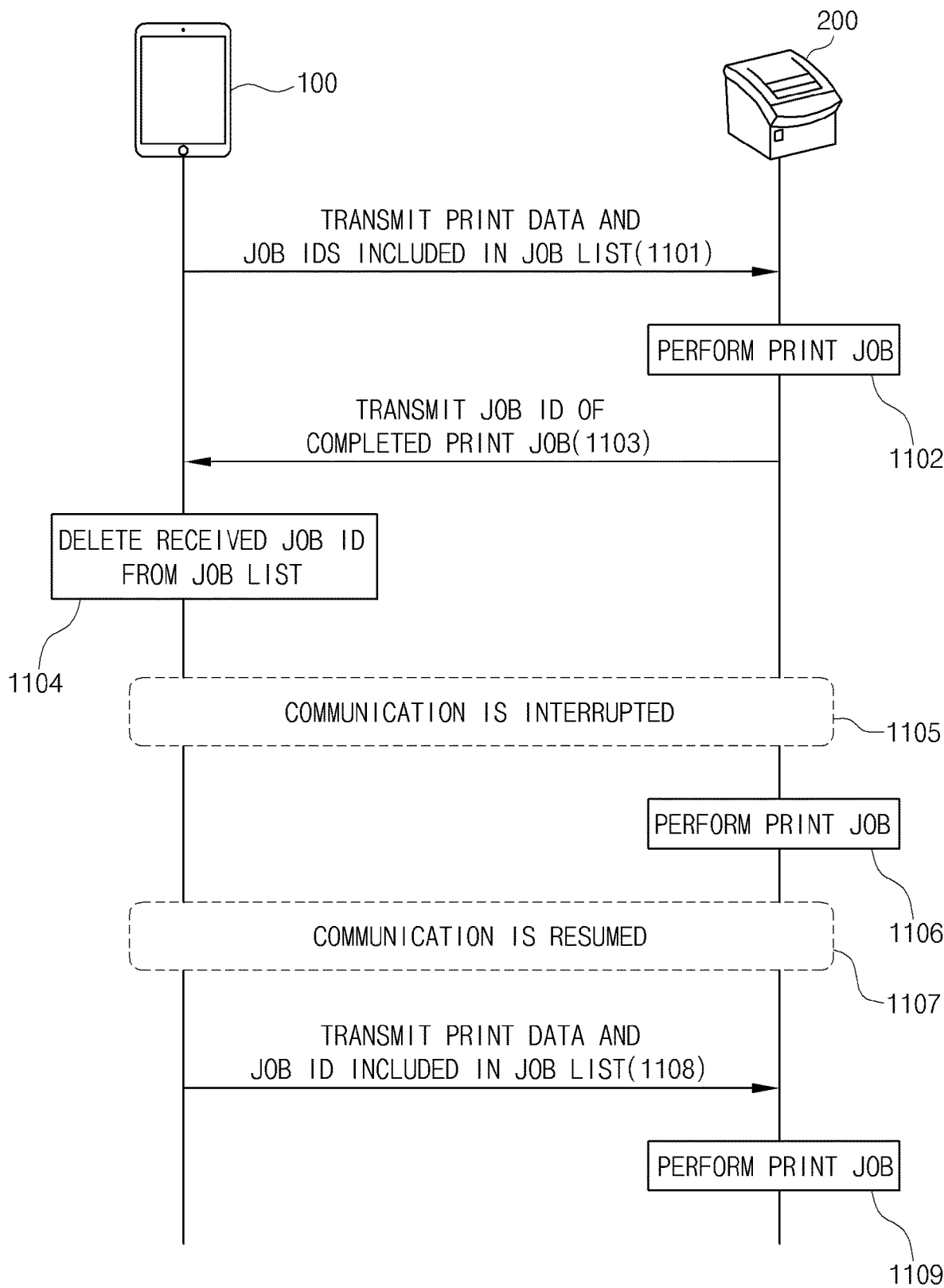

Since steps 1101 to 1107 of FIG. 11 are the same as the above-described steps 1001 to 1007 of FIG. 10, redundant descriptions thereof will be omitted.

Referring to FIG. 11, if communication between the host device 100 and the printer 200 is resumed, the host device 100 requests printing from the printer 200 while transmitting print data and at least one job ID, included in a job list updated at step 1104, to the printer 200 at step 1108, and the printer 200 performs print jobs at step 1109.

Since the result of a print job performed by the printer 200 during the interruption of communication at step 1106 is not incorporated into the job list of the host device 100, the print jobs that are performed by the printer 200 at step 1109 may include the print job already performed at step 1106.

In spite of this, the host device 100 does not become aware of the situation during the interruption of communication, and thus print data may be reliably prevented from being lost by requesting the printer 200 to perform all print jobs included in the updated job list at step 1104.

Methods of performing print jobs in the printing system will be described below with reference to FIGS. 12 and 13. Each of the methods of performing print jobs according to embodiments shown in FIGS. 12 and 13 includes steps that are performed in a time-series manner in the host device 100 shown in FIG. 2. Accordingly, descriptions that are omitted below but are given above in conjunction with the host device 100 shown in FIG. 2 may be applied to each of the methods of performing print jobs according to the embodiments shown in FIGS. 12 and 13.

Figure 12:
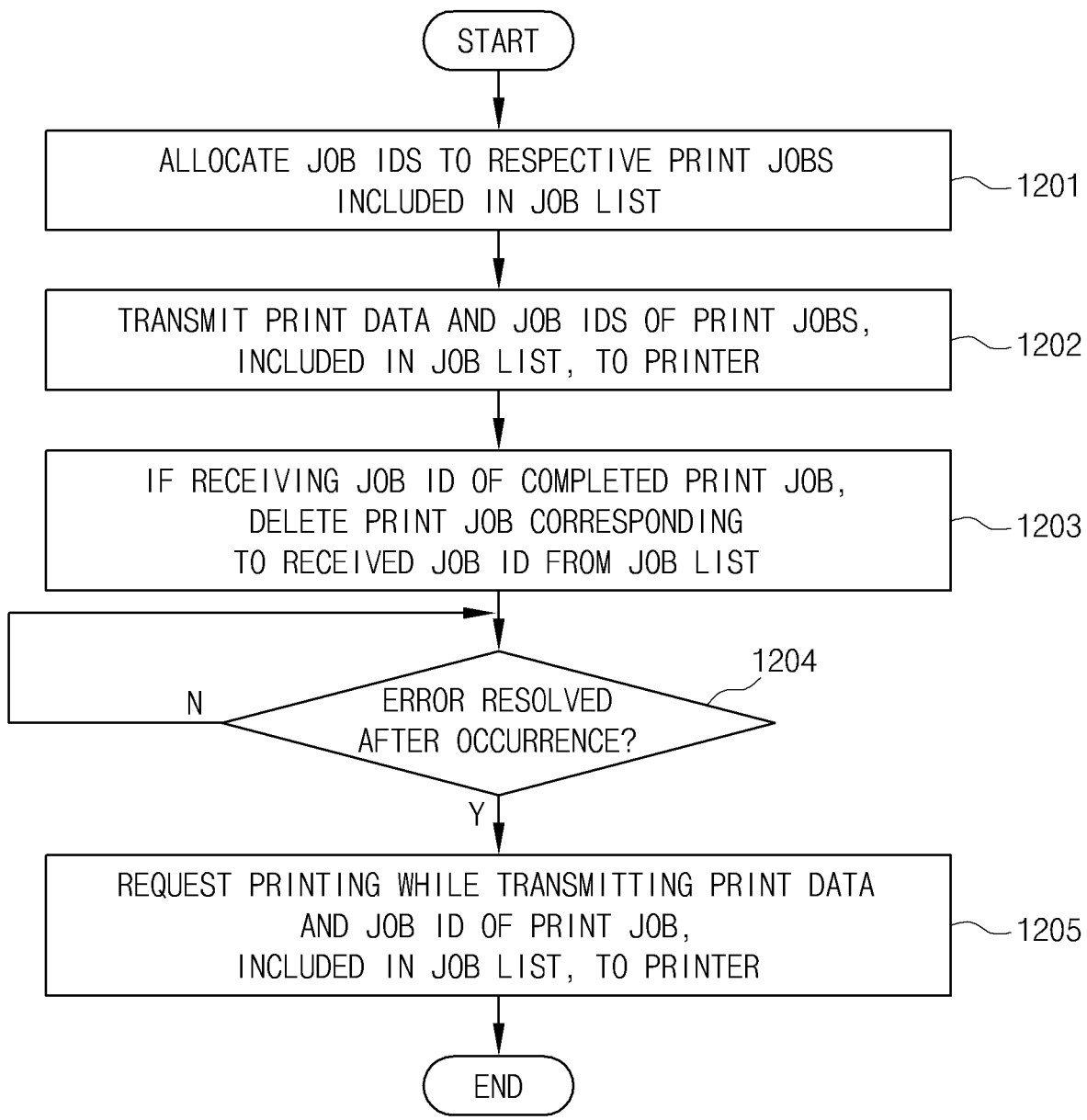
FIGS. 12 and 13 are flowcharts illustrating methods of performing print jobs in the printing system according to the first embodiment.

Referring to FIG. 12, the host device allocates job IDs to respective print jobs included in a job list at step 1201, and requests printing from the printer while transmitting the print data and job IDs of the print jobs, included in the job list, to the printer at step 1202.

At step 1203, if the host device receives the job ID of a completed print job from the printer, the host device updates the job list by deleting a print job corresponding to the received job ID from the job list.

At step 1204, the host device determines whether an error having occurred in the printing system has been resolved. If it is determined that the error having occurred in the printing system has been resolved, the host device requests printing from the printer while transmitting the print data and job ID of at least one print job, included in the job list, to the printer at step 1205.

Figure 13:
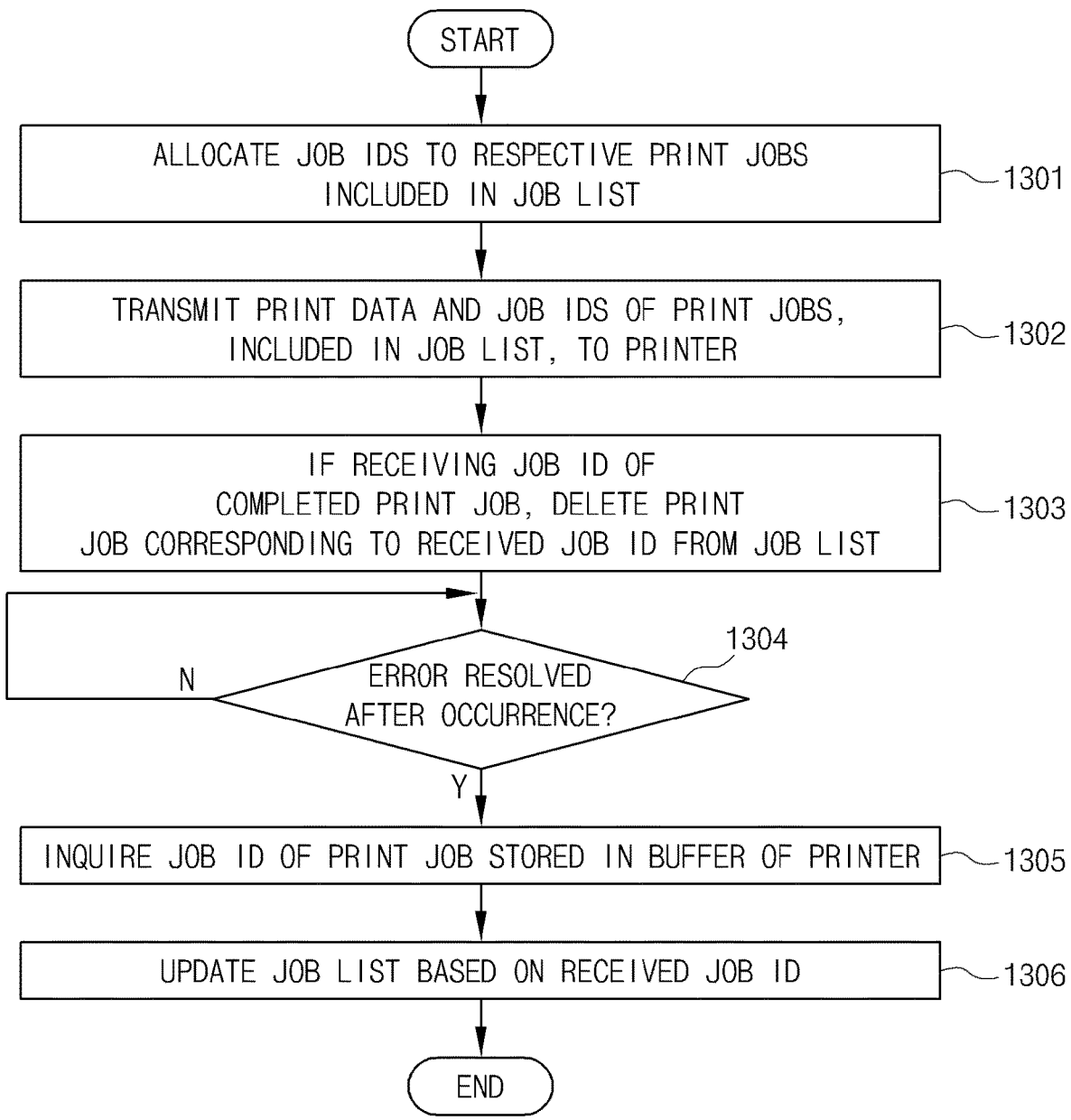

Referring to FIG. 13, the host device allocates job IDs to respective print jobs included in a job list at step 1301, and requests printing from the printer while transmitting the print data and job IDs of the print jobs, included in the job list, to the printer at step 1302.

At step 1303, if the host device receives the job ID of a completed print job from the printer, the host device updates the job list by deleting a print job corresponding to the received job ID from the job list.

At step 1304, the host device determines whether an error having occurred in the printing system has been resolved. If it is determined that the error having occurred in the printing system has been resolved, the host device inquires of the printer about the job ID of at least one print job stored in the buffer of the printer at step 1305.

If the host device receives the job ID from the printer, the host device updates the job list based on the received job ID at step 1306. For example, the host device deletes print jobs included in the job list except for a print job corresponding to the job ID received from the printer.

Although the embodiments in which the host device 100 functions to allocate job IDs to respective print jobs and manage a job list have been described hitherto, a separate relay device configured to relay communication between the host device and the printer may perform the above functions. An embodiment of a printing system 20 including a relay device will be described below with reference to FIGS. 14 to 20.

Figure 14:
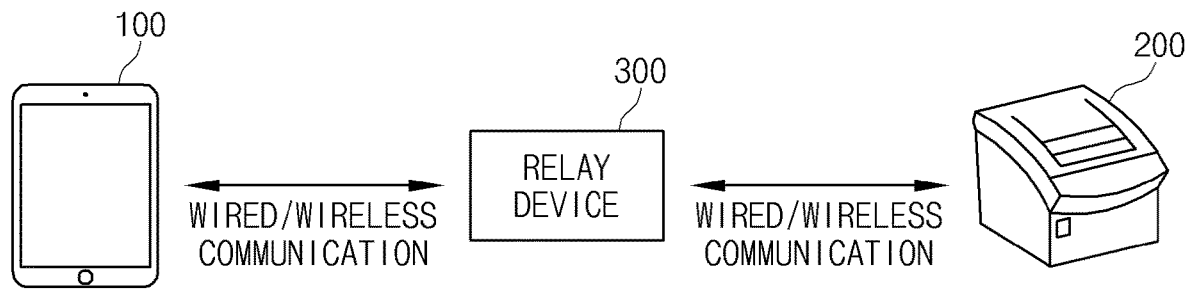
FIG. 14 is a view showing a printing system including a relay device according to a second embodiment.

FIG. 14 is a view showing the printing system 20 according to the present embodiment. Referring to FIG. 14, the printing system 20 according to the present embodiment may include a host device 100, a printer 200, and a relay device 300.

The relay device 300 is connected to the host device 100 and the printer 200 via wired/wireless communication, relays communication between the two devices, and may perform part of a printing process. For example, the relay device 300 may be a hub device configured to connect the two devices, or a server configured to be connectable over the Internet.

If the relay device 300 is a server, an application that performs printing may be installed on the host device 100, and the host device 100 may access the relay device 300 if the application is executed on the host device 100. Furthermore, if the relay device 300 is a server and an application that performs printing is installed on the host device 100, the relay device 300 may perform the function of managing print jobs, and only the progress and result of the printing process may be displayed on the screen of the host device 100.

In the printing system 20 shown in FIG. 14, if the host device 100 transmits print data to the relay device 300, the relay device 300 divides the print data into a plurality of print jobs, allocates job IDs to the respective print jobs, and manages the print jobs based on the job IDs.

Figure 15:
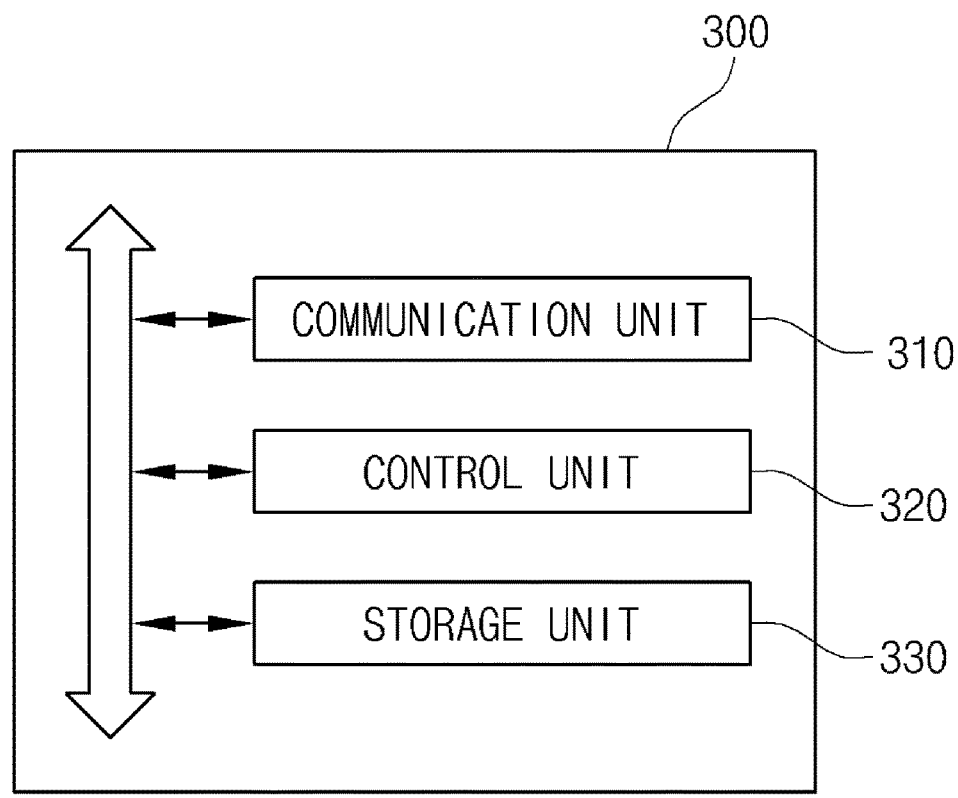
FIG. 15 is a view showing the configuration of a relay device according to the second embodiment.

FIG. 15 is a view showing the configuration of the relay device 300 according to the present embodiment. Referring to FIG. 15, the relay device 300 may include a communication unit 310, a control unit 320, and a storage unit 330.

The communication unit 310 supports wired/wireless communication between the host device 100 and the printer 200. For this purpose, the communication unit 310 may include a communication module that supports at least one of various types of wired/wireless communication methods. For example, the communication unit 310 may include a communication chipset, a communication port, etc.

The control unit 320 includes at least one processor, such as a CPU or the like, and controls the overall operation of the relay device 300. In particular, the control unit 320 divides print data, received from the host device 100, into a plurality of print jobs, allocates job IDs to the respective print jobs, and manages a job list based on the job IDs. A specific method by which the control unit 320 manages a job list based on job IDs will be described in detail below with reference to other drawings.

The storage unit 330 may store various types of programs and data. In particular, the storage unit 330 may store print data corresponding to print jobs, and may also store a job list including the job IDs of scheduled print jobs.

A method by which the relay device manages print jobs if an error had occurred and has been resolved in the printing system will be described in detail below with reference to FIGS. 16 to 18.

Figure 16:
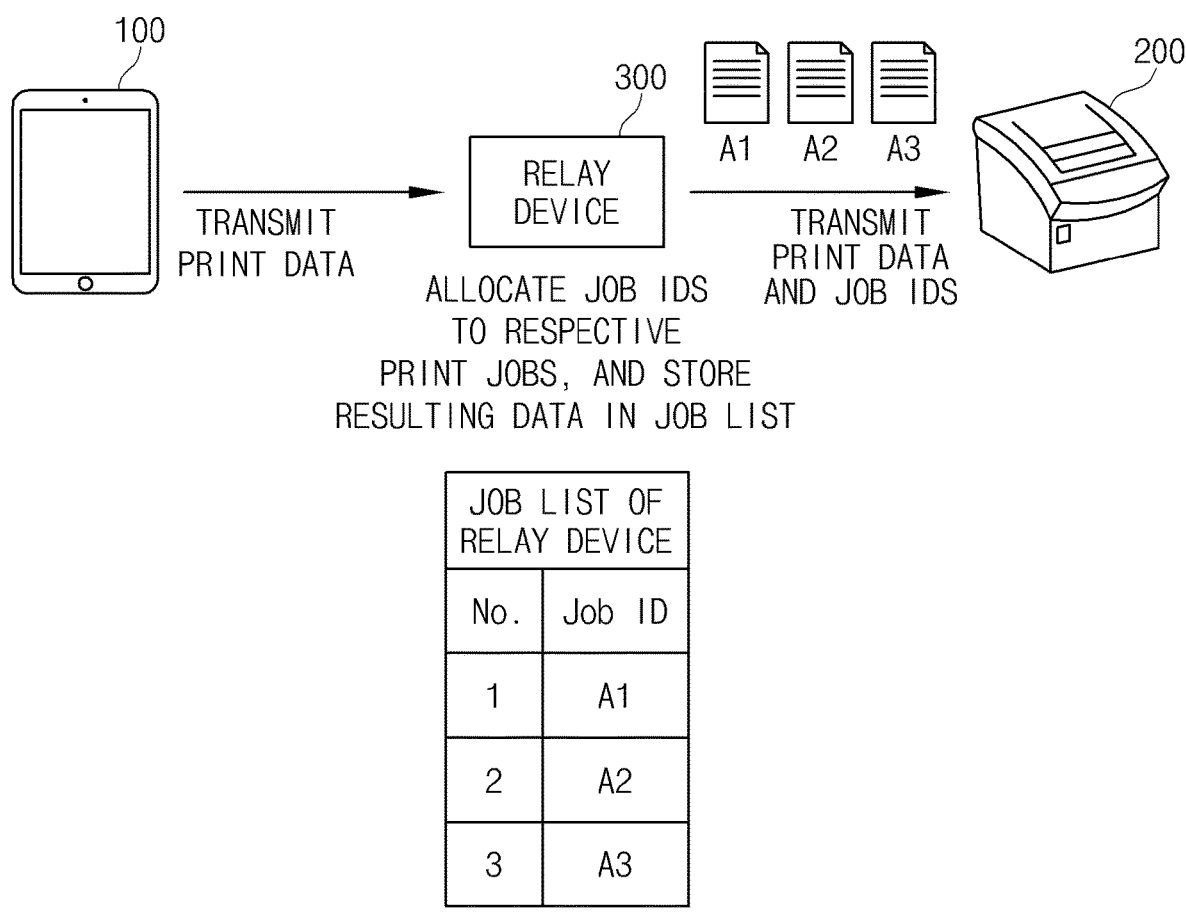
FIGS. 16 to 18 are views illustrating a method by which the relay device manages print jobs if an error had occurred and has been resolved in the printing system including a relay device according to the second embodiment.

FIG. 16 shows a situation in which if the host device 100 transmits print data to the relay device 300, the relay device 300 stores received print data in a job list and then transmits the received print data to the printer 200.

Referring to FIG. 16, if the host device 100 transmits print data to the relay device 300, the relay device 300 divides received print data into a plurality of print jobs, allocates job IDs to the respective print jobs, and stores resulting data in a job list. In this case, the relay device 300 may divide the print data, received from the host device 100, into print jobs on a page, document, or block basis. Thereafter, the relay device 300 requests printing from the printer while transmitting print data and job IDs corresponding to the print jobs, stored in the job list, to the printer 200.

Figure 17:
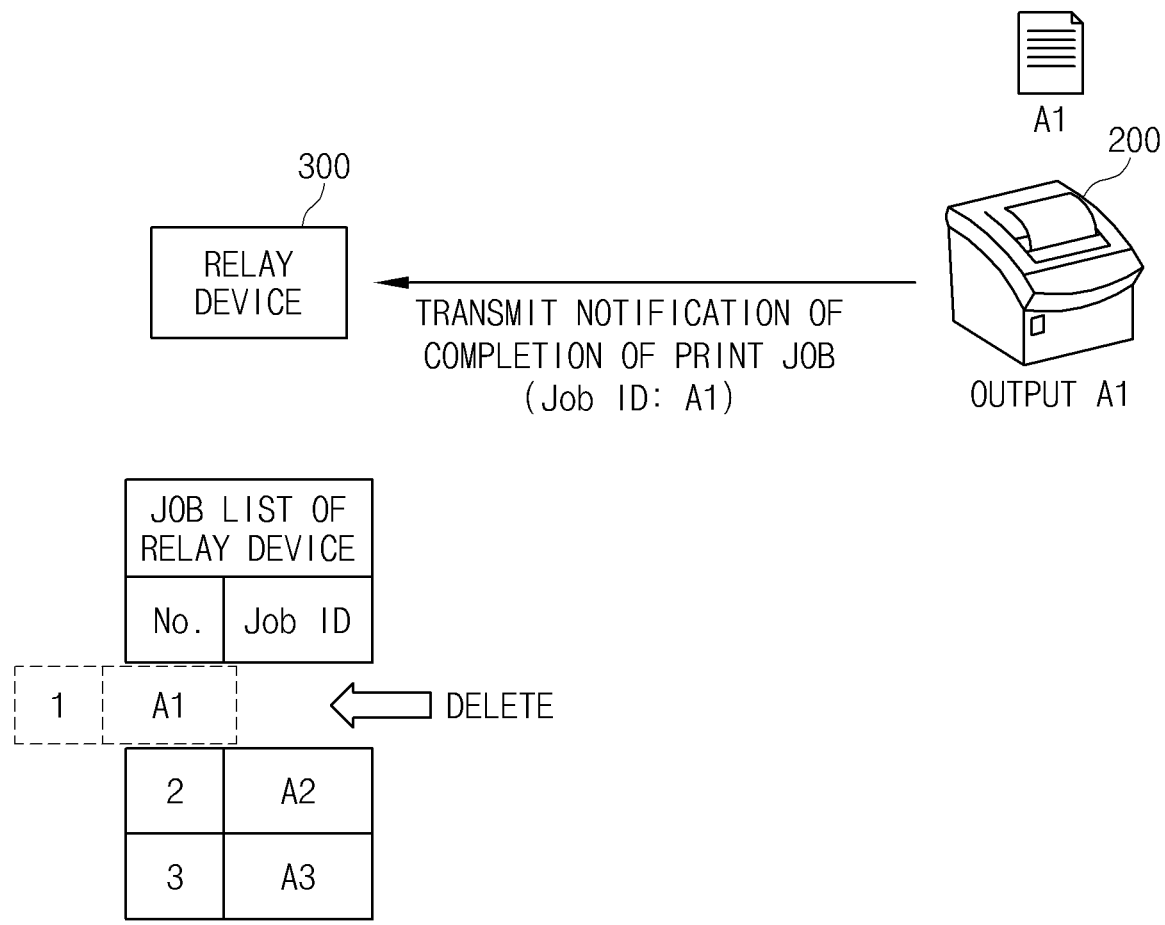

FIG. 17 shows a situation in which the job list of the relay device 300 is updated if the printer 200 completes a print job. Referring to FIG. 17, if the printer 200 completes a print job, the printer 200 transmits a job ID corresponding to the completed print job to the relay device 300. In FIG. 17, as the printer 200 completes a print job having a job ID of A1, the printer 200 notifies the host device 100 of the completion of the print job while transmitting "A1."

Meanwhile, a condition under which the printer 200 determines that a print job is completed and a method by which the printer 200 transmits the job IDs of one or more completed print jobs in a synchronous/asynchronous manner are the same as described in conjunction with FIG. 4.

If the relay device 300 receives the job ID of the completed print job from the printer 200, the relay device 300 updates the job list thereof by deleting a print job corresponding to the received job ID from the job list. In FIG. 17, since the relay device 300 receives "A1" from the printer 200, the relay device 300 deletes a print job corresponding to "A1" from the job list.

As described above, the relay device 300 manages the job list based on the job IDs of the print jobs, thereby rapidly incorporating a print job performance state in the printer 200 into the job list.

Figure 18:
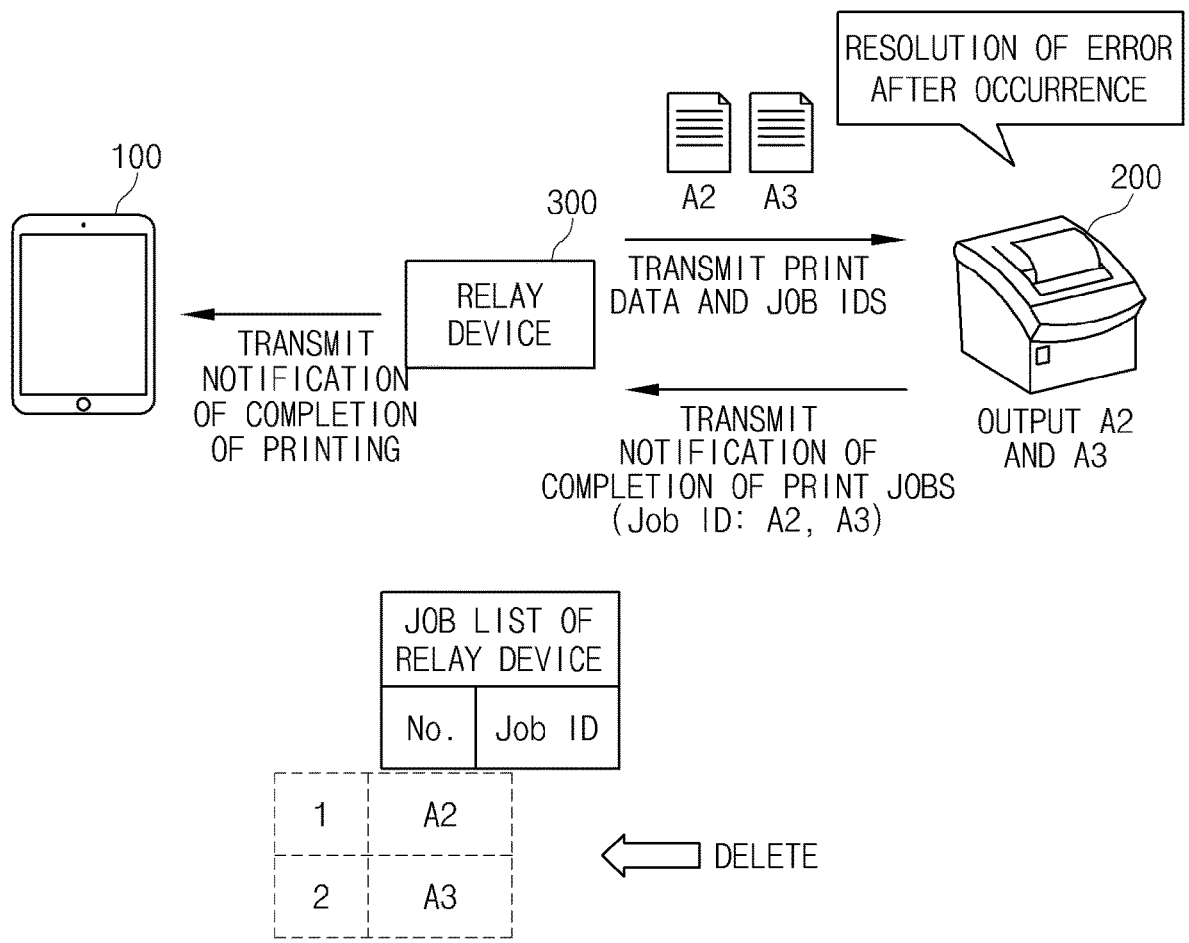

FIG. 18 shows a situation in which the performance of a print job is resumed if an error had occurred and has been resolved in the printing system. The relay device 300 may detect the occurrence and resolution of an error in the printing system, and a specific method of detecting the occurrence and resolution of an error is the same as described in conjunction with FIGS. 5 and 6. Furthermore, the types of errors occurring in the printing system and the processing of data stored in the buffer of the printer 200 if an error occurs are the same as described in conjunction with FIG. 5.

Referring to FIG. 18, if an error had occurred and has been resolved in the printing system, the relay device 300 requests printing from the printer 200 while transmitting the print data and job ID of at least one print job, included in a job list, to the printer 200. In this case, since a print job performance state before the occurrence of the error in the printing system has been incorporated into the job list of the relay device 300, it may be possible to minimize the unnecessary redundant performance of a print job while preventing print data from being lost.

If the printer 200 completes the print jobs transmitted by the relay device 300, the printer 200 transmits "A2" and "A3," i.e., the job IDs of the completed print jobs, to the relay device 300, and the relay device 300 deletes print jobs corresponding to the received job IDs from the job list. If all print jobs included in the job list are completed, the relay device 300 may transmit notification of the completion of printing to the host device 100.

Figure 19:
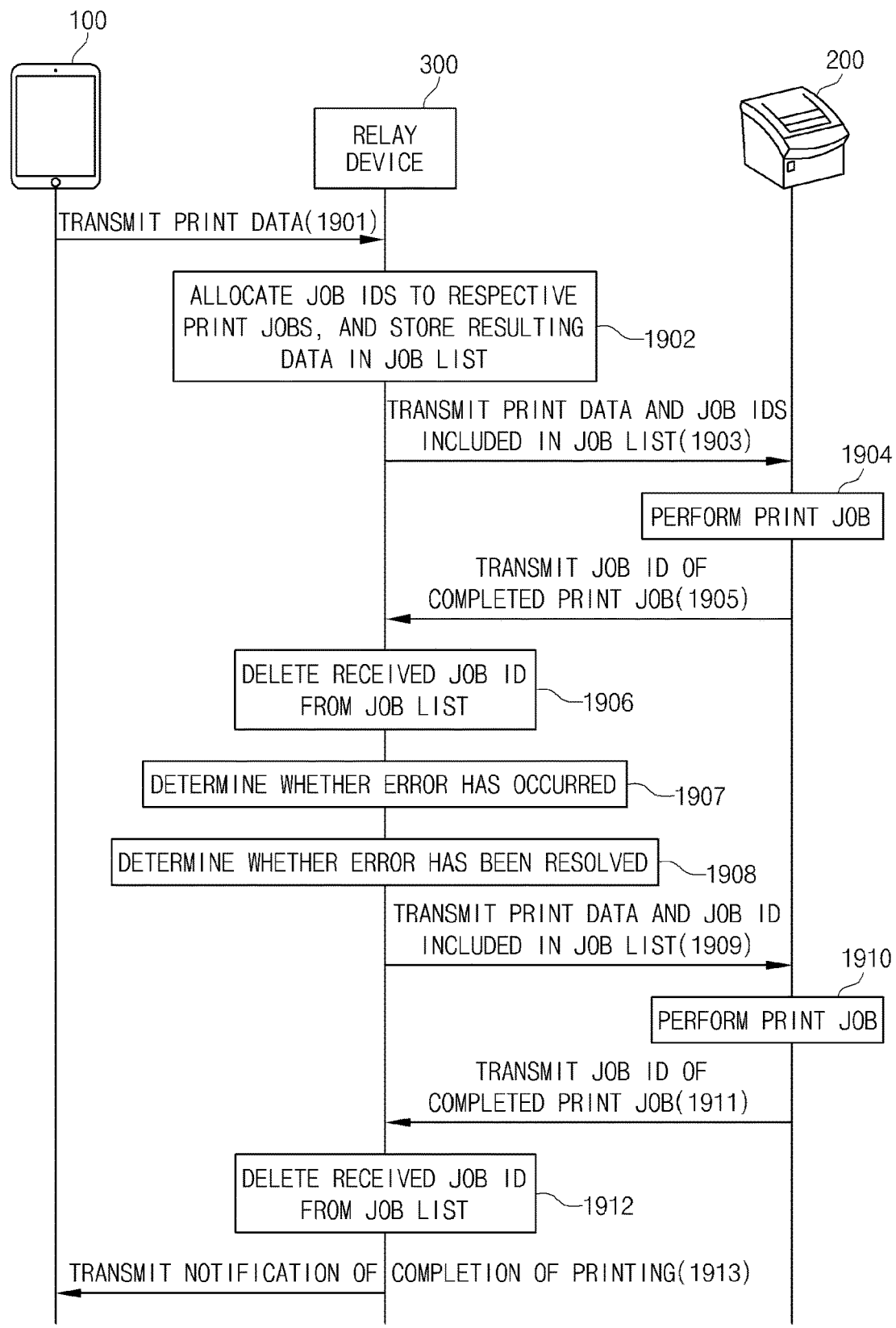
FIG. 19 is a view showing a process of performing print jobs in the printing system including a relay device according to the second embodiment.

FIG. 19 is a view showing a process of performing print jobs in the printing system including a relay device according to the present embodiment. Referring to FIG. 19, if the host device 100 transmits print data to the relay device 300 at step 1901, the relay device 300 divides the received print data into a plurality of print jobs, allocates job IDs to the respective print jobs, and stores resulting data in a job list at step 1902.

If the relay device 300 requests printing from the printer 200 while transmitting the print data and job IDs of the print jobs, included in the job list, to the printer 200 at step 1903, the printer 200 performs printing at step 1904.

If the printer 200 completes at least one of the received print jobs, the printer 200 transmits the job ID of the completed print job to the relay device 300 at step 1905. In this case, the printer 200 may transmit the job ID to the relay device 300 in a synchronous or asynchronous manner. The relay device 300 deletes a print job corresponding to the received job ID from the job list at step 1906.

If the relay device 300 determines that an error had occurred in the printing system at step 1907 and determines that the error has been resolved at step 1908, the relay device 300 requests printing from the printer 200 while transmitting the print data and job ID of at least one print job, included in the job list, to the printer 200 at step 1909. In this case, since the job list of the relay device 300 has been updated already at step 1906, a print job performance state before the occurrence of the error in the printing system has been incorporated into the job list.

If the printer 200 completes a print job at step 1910, the printer 200 transmits the job ID of the completed print job to the relay device 300 at step 1911. At step 1912, the relay device 300 deletes the received job ID from the job list. If all print jobs included in the job list are completed, the relay device 300 transmits notification of the completion of printing to the host device 100 at step 1913.

Figure 20:
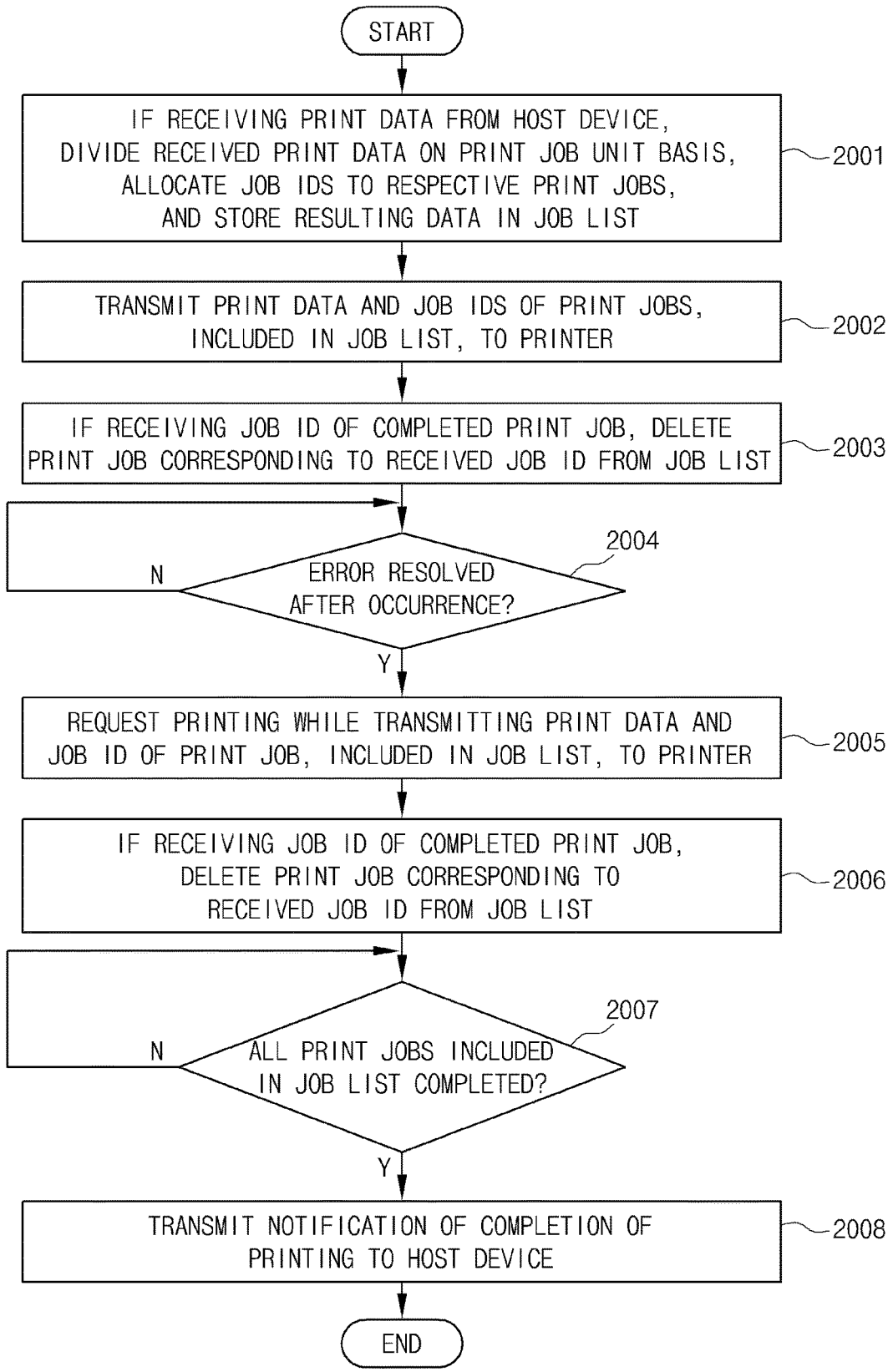
FIG. 20 is a flowchart illustrating a method of performing print jobs in the printing system including a relay device according to the second embodiment.

FIG. 20 is a flowchart illustrating a method of performing print jobs in the printing system including a relay device according to the present embodiment. The steps included in the flowchart of FIG. 20 are performed by the relay device.

Referring to FIG. 20, at step 2001, if the relay device receives print data from the host device, the relay device divides the received print data on a print job unit basis, allocates job IDs to respective print jobs, and stores resulting data in a job list. At step 2002, the relay device requests printing from the printer while transmitting the print data and job IDs of the print jobs, included in the job list, to the printer. At step 2003, if the relay device receives the job ID of a completed print job from the printer, the relay device deletes a print job corresponding to the received job ID form the job list.

At step 2004, the relay device determines whether an error had occurred and has been resolved in the printing system. If the error had occurred and has been resolved, the process proceeds to step 2005, at which the relay device requests printing from the printer while transmitting the print data and job ID of at least one print job, included in the job list, to the printer.

At step 2006, if the relay device receives the job ID of a completed print job from the printer, the relay device deletes a print job corresponding to the received job ID from the job list.

The relay device determines whether all print jobs included in the job list are completed at step 2007. If all the print jobs are completed, the relay device transmits notification of the completion of printing to the host device at step 2008.

Meanwhile, in the above-described embodiments, the management of print jobs that are performed by the host device or relay device may be performed by an interface module that is contained in the printer. An embodiment in which the interface module contained in the printer performs the management of print jobs will be described below.

Figure 21:
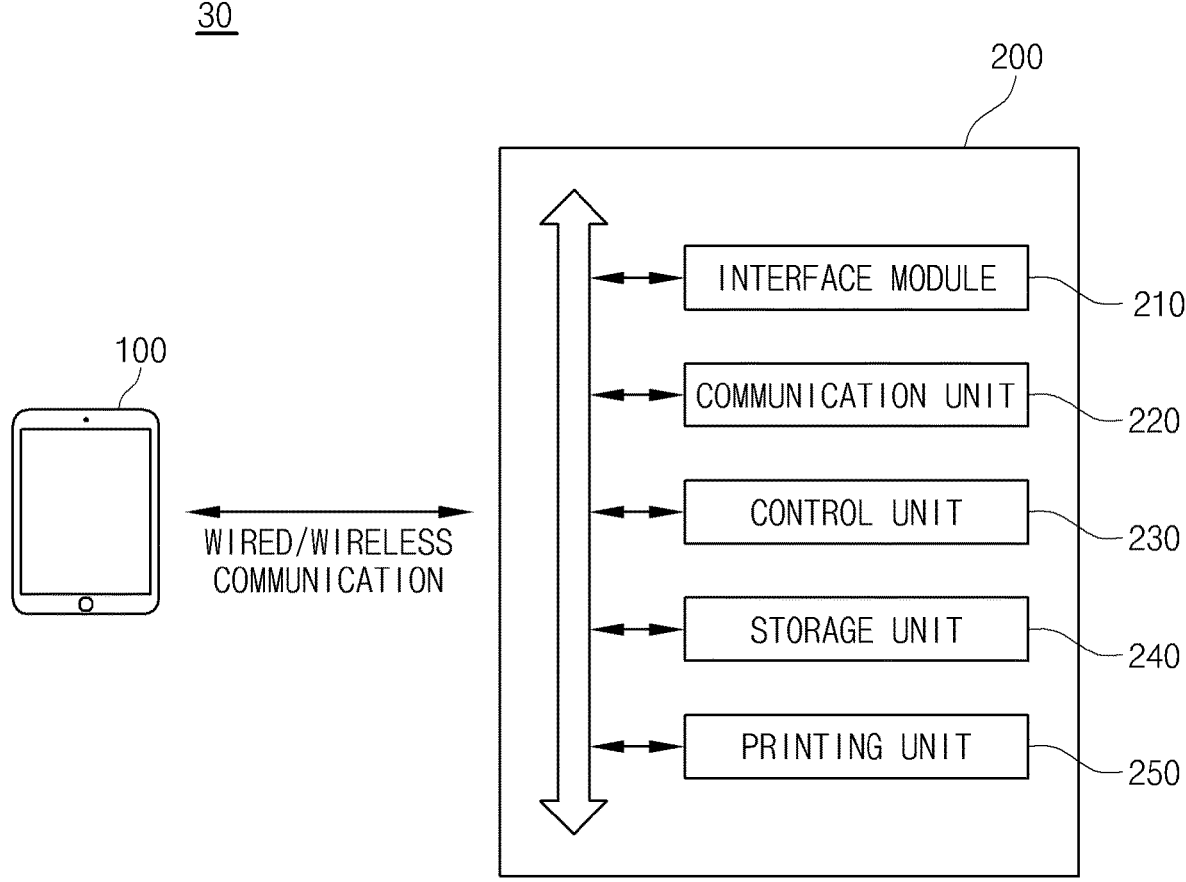
FIG. 21 is a view showing a printing system according to a third embodiment.

FIG. 21 is a view showing a printing system 30 according to an embodiment. Referring to FIG. 21, the printing system includes a host device 100, and a printer 200. Furthermore, the printer 200 may include an interface module 210, a communication unit 220, a control unit 230, a storage unit 240, and a printing unit 250.

The interface module 210 divides print data, received from the host device 100, into a plurality of print jobs, allocates job IDs to the respective print jobs, and manages the print jobs based on the job IDs. The interface module 210 stores and manages the print jobs in a job list, and requests printing from the control unit 230 while transmitting the print data and job IDs of the print jobs to the control unit 230. The interface module 210 may include a separate storage space independent of the storage unit 240 in order to store and manage the job list, or may be allocated a predetermined space of the storage unit 240 and use the predetermined space.

The communication unit 220 supports communication with the host device 100. For this purpose, the communication unit 220 may include a communication module that supports at least one of various types of wired/wireless communication methods. For example, the communication unit 220 may include a communication chipset, a communication port, etc.

The control unit 230 includes at least one processor, such as a CPU or the like, and controls the overall operation of the printer 200. In particular, if the control unit 230 receives print data, job IDs and a request for printing from the interface module 210, the control unit 230 stores and manages the received print data and job IDs in the buffer of the storage unit 240 in the form of a job list. The control unit 230 requests printing from the printing unit 250 while transmitting the print data and job IDs of the print jobs, included in the job list of the buffer, to the printing unit 250. If the control unit 230 receives the job ID of a completed print job from the printing unit 250, the control unit 230 deletes a print job corresponding to the received job ID from the job list of the buffer, and transmits the received job ID to the interface module 210.

A method by which the interface module contained in the printer manages print jobs if an error had occurred and has been resolved in the printing system according to the present embodiment will be described below with reference to FIGS. 22 to 27.

Figure 22:
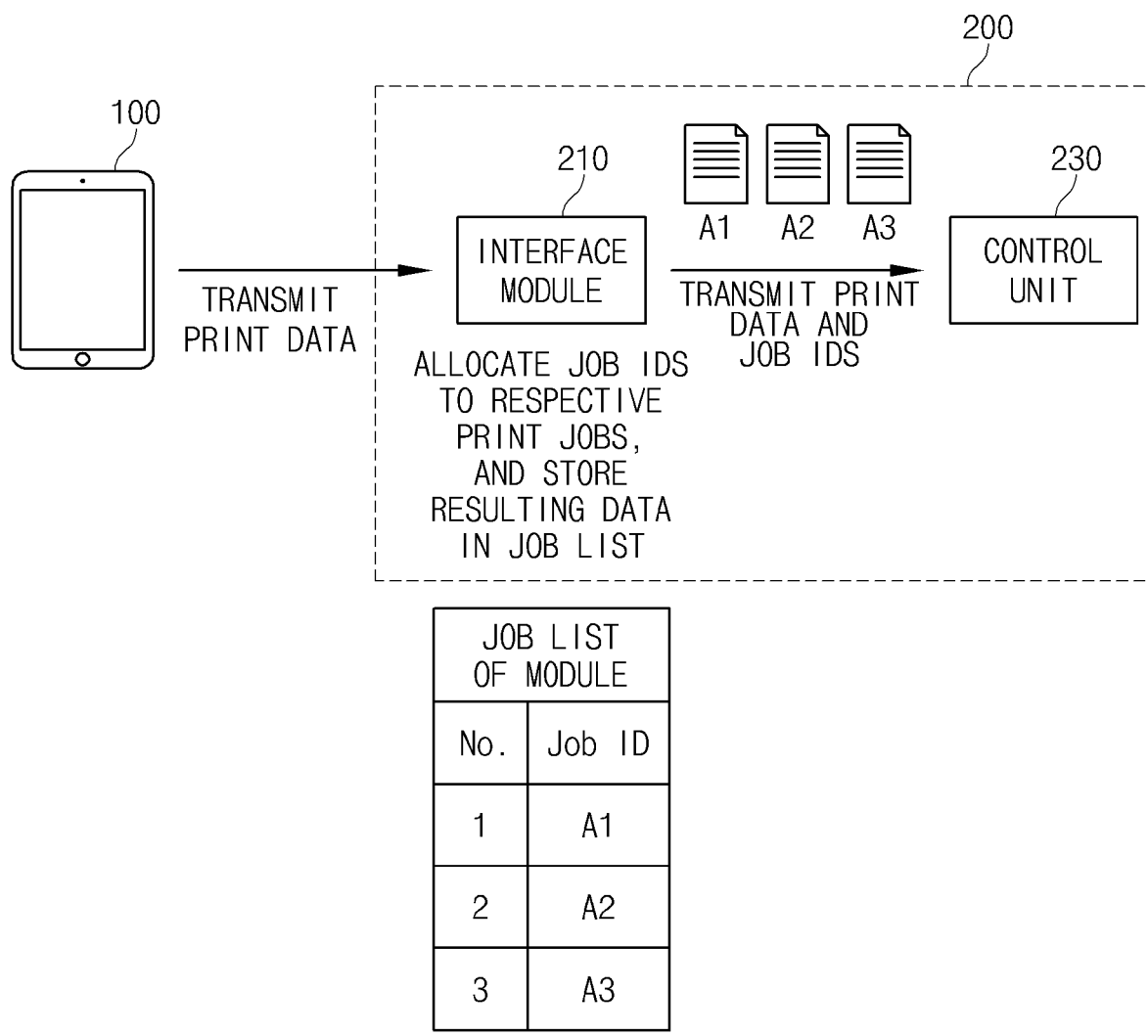
FIGS. 22 to 27 are views illustrating a method by which an interface module contained in a printer manages print jobs if an error had occurred and has been resolved in the printing system according to the third embodiment.

Referring to FIG. 22, if the host device 100 transmits print data to the printer 200, the interface module 210 divides the received print data into a plurality of print jobs, allocates job IDs to the respective print jobs, and stores resulting data in a job list. The interface module 210 requests printing from the control unit 230 while transmitting the print data and job IDs of the print jobs, stored in the job list, to the control unit 230.

Figure 23:
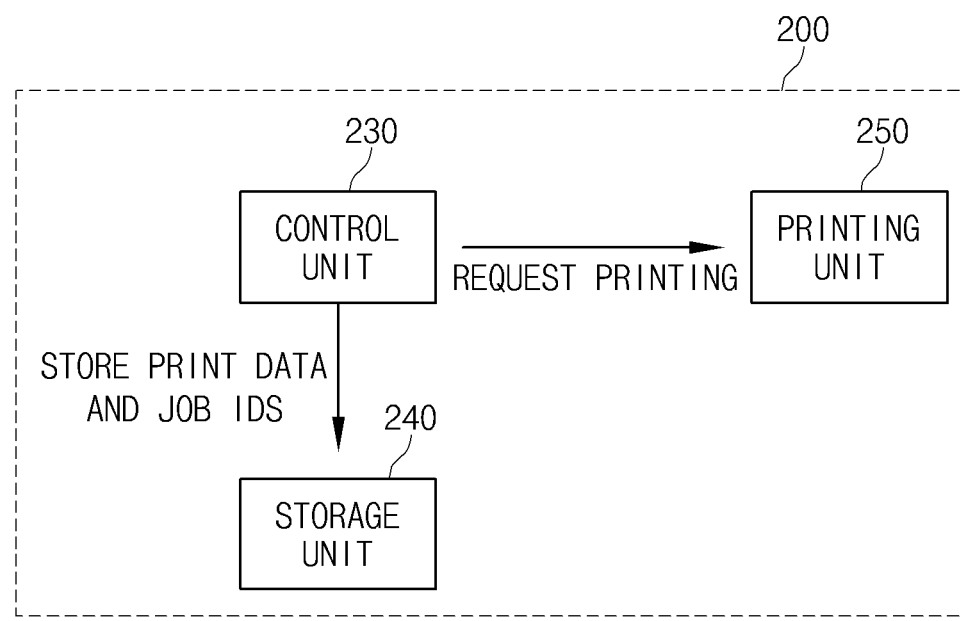

Referring to FIG. 23, the control unit 230 generates and manages a job list by storing the print data and job IDs, received from the interface module 210, in the buffer of the storage unit 240. Furthermore, the control unit 230 requests the printing unit 250 to perform the print jobs included in the job list of the buffer.

Figure 24:
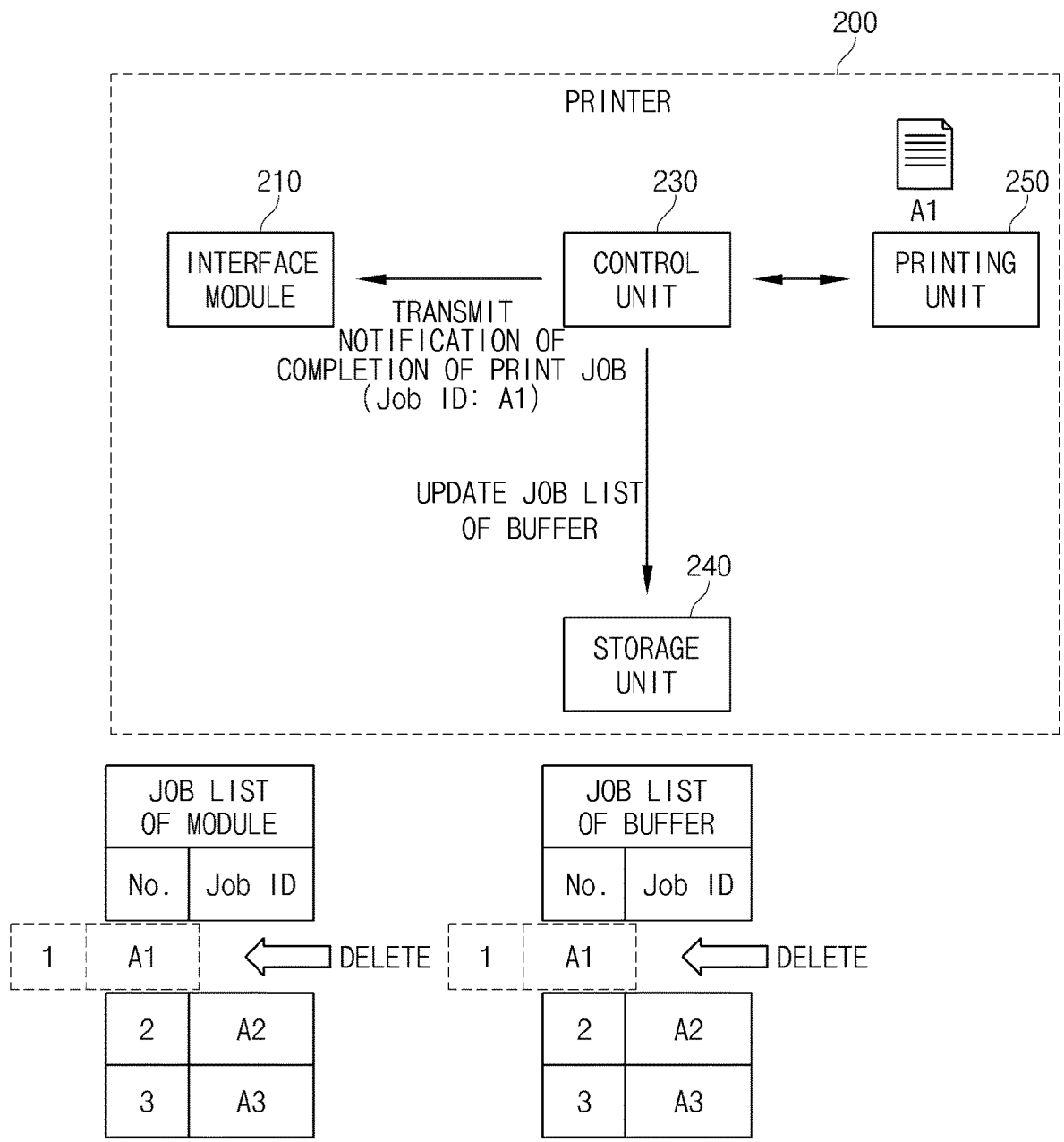

Referring to FIG. 24, if the printing unit 250 performs a print job having a job ID of A1, the control unit 230 deletes a print job corresponding to A1 from the job list stored in the buffer, and transmits job ID "A1" to the interface module 210. The interface module 210 deletes a print job corresponding to the received job ID "A1" from the job list.

Figure 25:
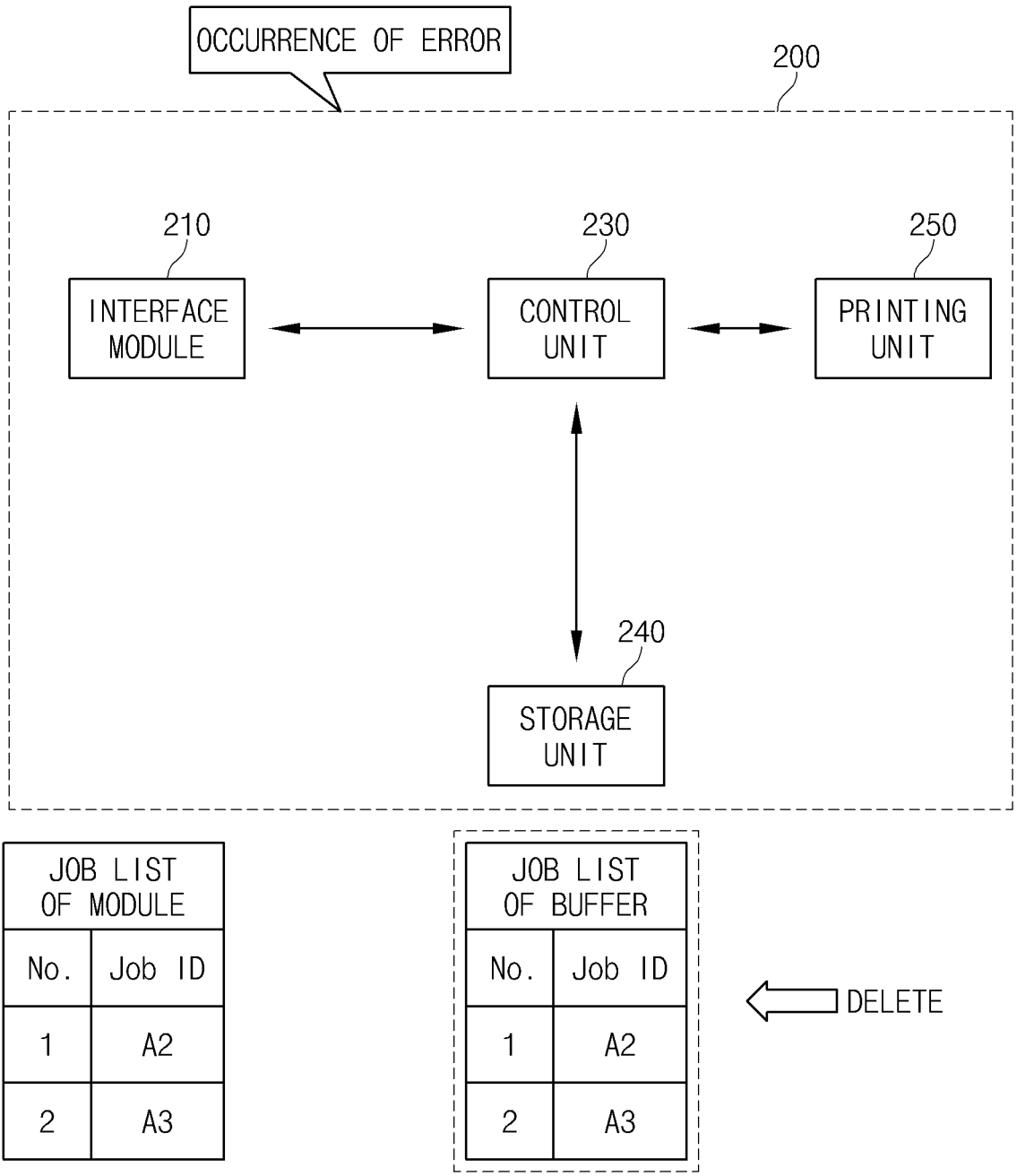

Referring to FIG. 25, if an error occurs in the printing system, the control unit 230 may delete the job list stored in the buffer of the storage unit 240.

Figure 26:
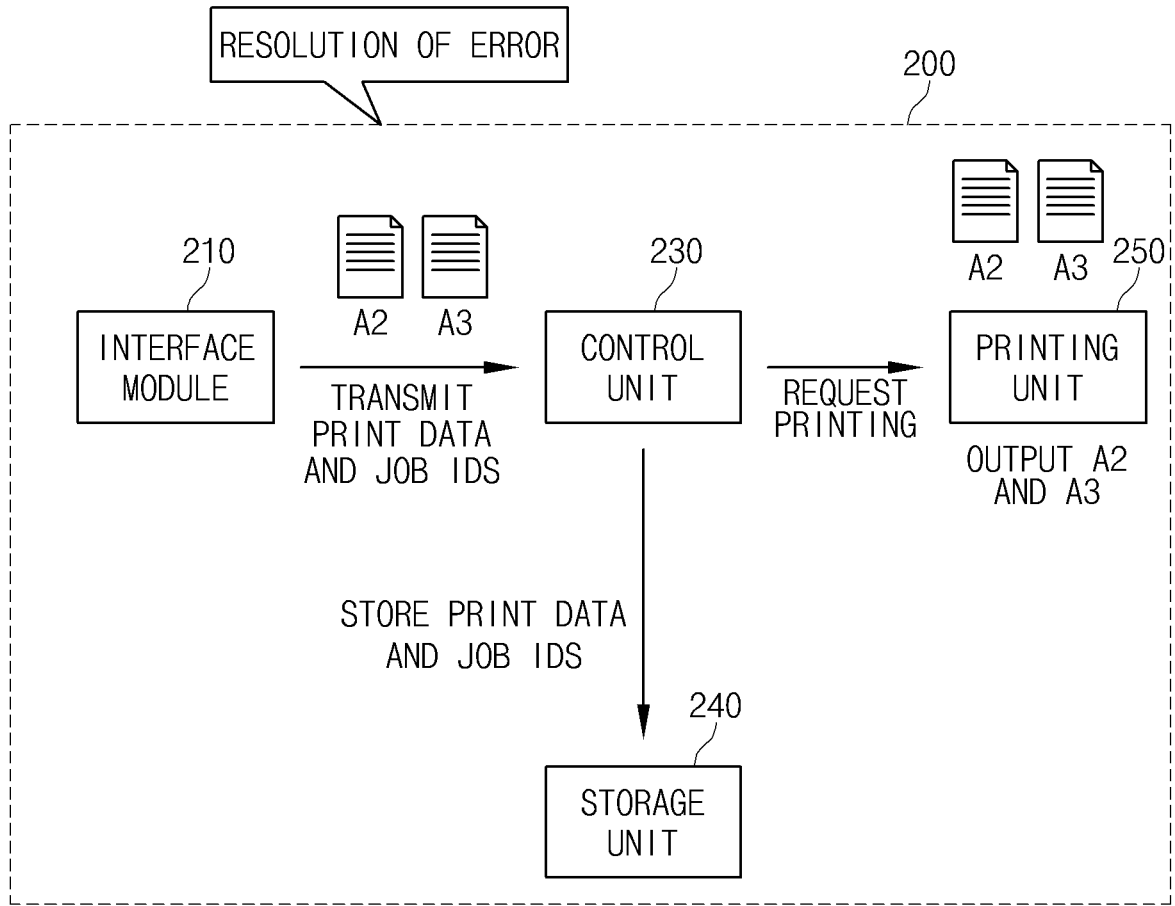

Referring to FIG. 26, if the error having occurred in the printing system has been resolved, the interface module 210 requests printing from the control unit 230 while transmitting the print data and job IDs of print jobs stored in the job list of the control unit 230. The control unit 230 stores the received print data and job IDs in the buffer of the storage unit 240 in the form of a job list, and requests the printing unit 250 to perform the print jobs included in the job list of the buffer.

Figure 27:
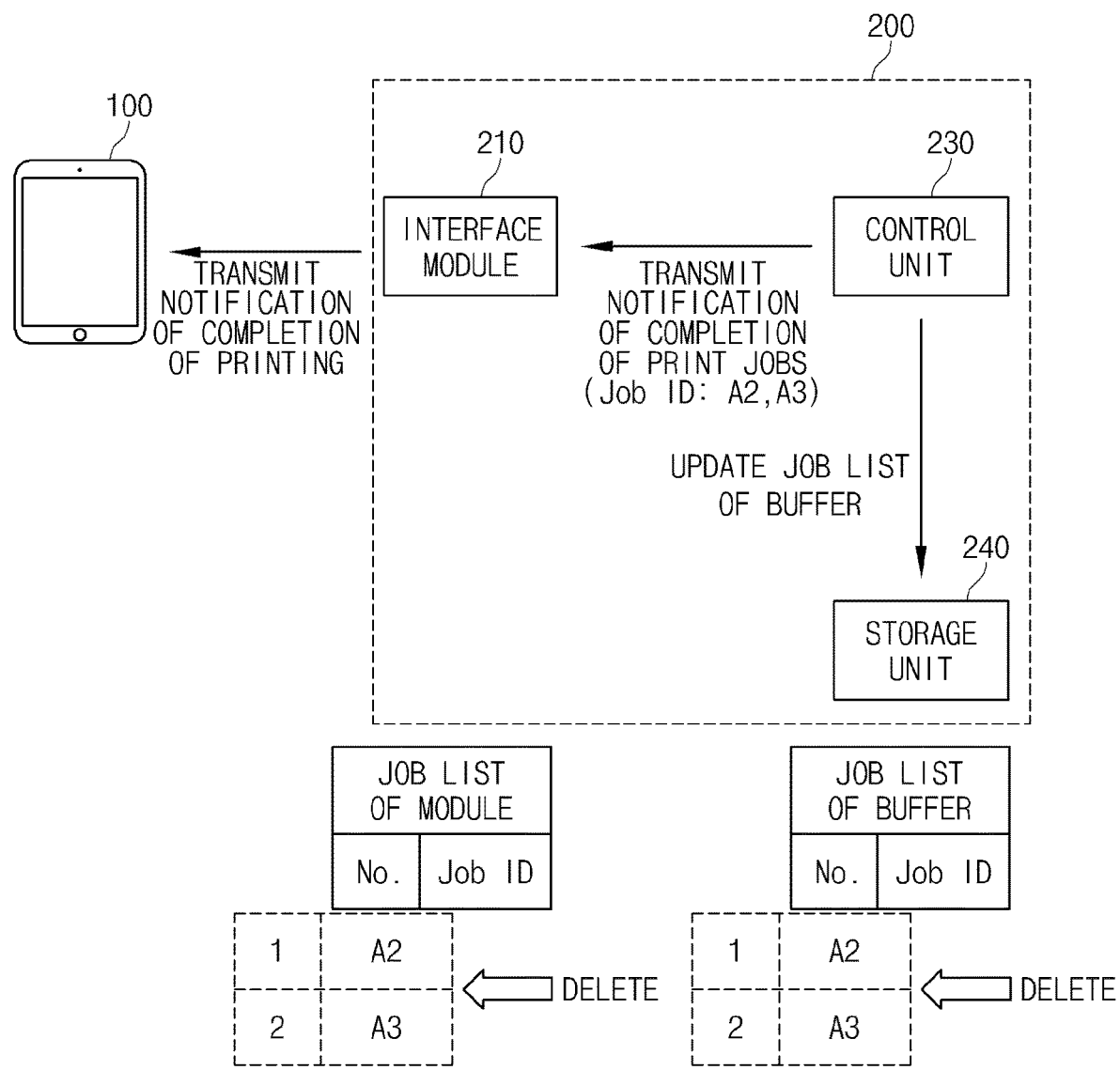

Referring to FIG. 27, if the printing unit 250 completes all received print jobs, the control unit 230 deletes the completed print jobs from the job list stored in the buffer, and transmits the job IDs of the completed print jobs to the interface module 210. The interface module 210 deletes print jobs corresponding to the received job IDs from the job list, and transmits notification of the completion of printing to the host device 100 because all the print jobs included in the job list are completed.

Figure 28:
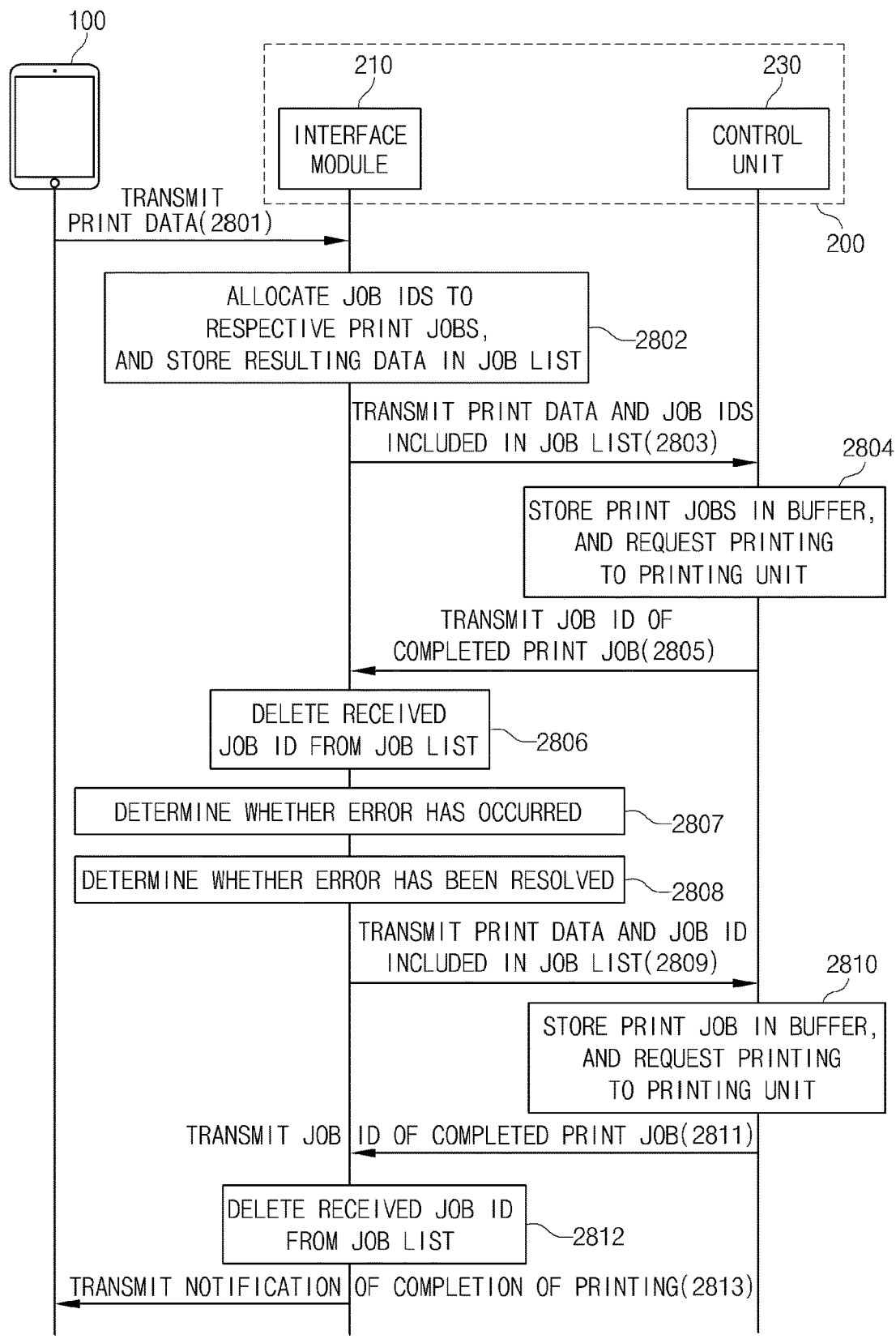
FIG. 28 is a view illustrating a process of performing print jobs in the printing system according to the third embodiment.

FIG. 28 is a view illustrating a process of performing print jobs in the printing system according to the present embodiment. Referring to FIG. 28, if the host device 100 transmits print data to the printer 200 at step 2801, the interface module 210 of the printer 200 divides the print data into a plurality of print jobs, allocates job IDs to the respective print jobs, and stores resulting data in a job list at step 2802.

If the interface module 210 transmits the print data and job IDs of the print jobs included in the job list to the control unit 230 at step 2803, the control unit 230 stores the received print jobs in the buffer, and requests the printing unit to perform the print jobs at step 2804.

If the printing unit completes a print job, the control unit 230 transmits the job ID of the completed print job to the interface module 210 at step 2805. At step 2806, the interface module 210 deletes a print job corresponding to the received job ID from the job list.

If the interface module 210 determines that an error has occurred in the printing system at step 2807 and determines that the error has been resolved at step 2808, the interface module 210 requests printing from the control unit 230 while transmitting the print data and job IDs of print jobs, included in the job list, to the control unit 230 at step 2809.

At step 2810, the control unit 230 stores the print jobs, received from the interface module 210, in the buffer, and requests the printing unit to perform the print jobs stored in the buffer.

If the printing unit completes a print job, the control unit 230 transmits the job ID of the completed print job to the interface module 210 at step 2811. At step 2812, the interface module 210 deletes a print job corresponding to the received job ID from the job list.

If the interface module 210 completes all print jobs included in the job list, the interface module 210 transmits notification of the completion of printing to the host device 100 at step 2813.

Figure 29:
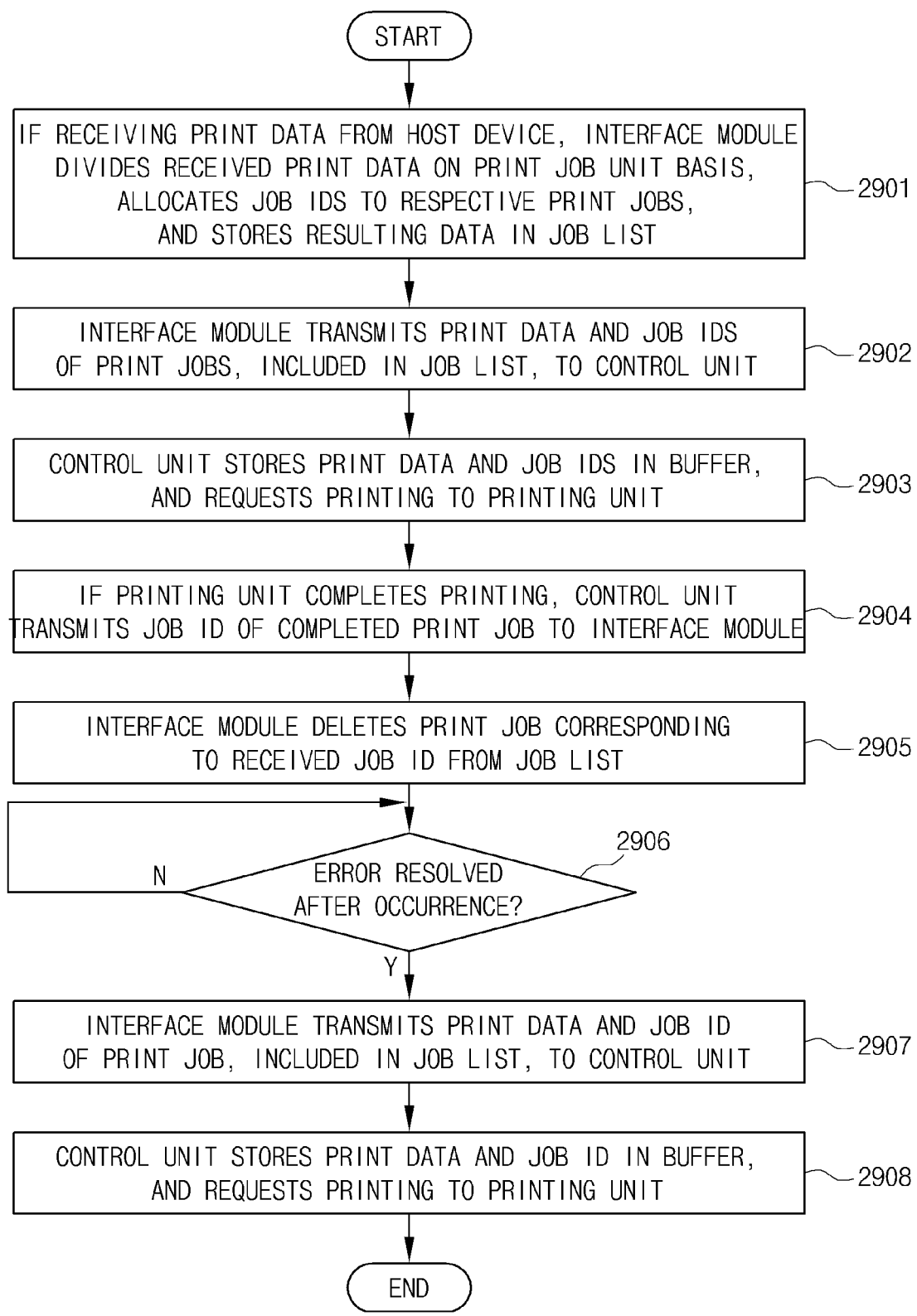
FIG. 29 is a flowchart illustrating a method of performing print jobs in the printing system according to the third embodiment.

FIG. 29 is a flowchart illustrating a method of performing print jobs in the printing system according to the present embodiment. The steps included in the flowchart of FIG. 29 are performed by the components of the printer.

Referring to FIG. 29, at step 2901, if the printer receives print data from the host device, the interface module divides the received print data on a print job unit basis, allocates job IDs to print jobs, and stores resulting data in a job list. Thereafter, at step 2902, the interface module requests printing from the control unit while transmitting the print data and job IDs of the print jobs, included in the job list, to the control unit.

At step 2903, the control unit stores the print data and job IDs, received from the interface module, in the job list of the buffer, and requests the printing unit to perform the print jobs included in the job list. At step 2904, if the printing unit completes a print job, the control unit transmits the job ID of the completed print job to the interface module. At step 2905, the interface module deletes a print job corresponding to the received job ID from the job list.

The interface module determines whether an error had occurred and has been resolved in the printing system at step 2906, the interface module requests printing from the control unit while transmitting the print data and job ID of at least one print job, included in the job list, to the control unit at step 2907 if it is determined that the error had occurred and has been resolved. At step 2908, the control unit stores the print data and job ID received from the interface module in the job list of the buffer, and requests the printing unit to perform the print job included in the job list of the buffer.

The term "unit" used herein refers to, but is not limited to, a software component or a hardware component, such as a field programmable gate array (FPGA) or application specific integrated circuit (ASIC), that performs a specific task. A unit may be configured to reside on an addressable storage medium, and may be configured to be executed on one or more processors. Accordingly, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functions provided in components and units may be combined into a smaller number of components and units, or may be separated into additional components and units.

Furthermore, components and units may be configured to be executed on one or more central processing units (CPUs) inside a device or security multimedia card.

Each of the methods of performing print jobs in a printing system according to the embodiments described in conjunction with FIGS. 8 to 13, 19 and 20, and 28 and 29 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, each of the methods of performing print jobs in a printing system according to the embodiments described in conjunction with FIGS. 8 to 13, 19 and 20, and 28 and 29 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, each of the methods of performing print jobs in a printing system according to the embodiments described in conjunction with FIGS. 8 to 13, 19 and 20, and 28 and 29 may be implemented in such a way that a computer program, such as that described above, is executed by a computing device. The computing device may include at least part of a processor, memory, a storage device, a high-speed interface accessing the memory and a high-speed expansion port, and a low-speed interface accessing a low-speed bus and a storage device. These components are connected to each other by means of various buses, and may be mounted on a common motherboard or by means of another appropriate method.

In this case, the processor may process instructions in a computing device. For example, these instructions may be instructions that are stored in memory or a storage device and that are used to display graphics information adapted to provide a graphical user interface (GUI) to an external input/output device, for example, a display connected to a high-speed interface. As another embodiment, a plurality of processors and/or a plurality of buses may be appropriately used along with a plurality of pieces of memory and memory forms. Furthermore, the processor may be implemented as a chipset that includes chips including a plurality of independent analog and or digital processors.

Furthermore, the memory stores information in a computing device. For example, the memory may include a volatile memory unit or a set of volatile memory units. As another example, the memory may include a non-volatile memory unit or a set of non-volatile memory units. Furthermore, the memory may be, for example, another type of computer-readable medium, such as a magnetic or optical disk.

Furthermore, the storage device may provide a large-sized storage space to a computing device. The storage device may be a computer-readable medium or a configuration including such a medium. For example, the storage device may include devices included in a storage area network (SAN), or may include another component. The storage device may be a floppy disk device, a hard disk device, an optical disk device, a tape device, flash memory, or another semiconductor memory device or device array similar thereto.

According to any one of the above-described embodiments, the host device manages print jobs by allocating job IDs to the respective print jobs, and thus the advantage of preventing print data from being lost even if an error occurs in the printing system may be expected.

According to any one of the above-described embodiments, the job list of the host device is updated based on a job list stored in the buffer of the printer if an error had occurred and has been resolved in the printing system, and thus the advantage of resolving an inconsistency between the job list of the host device and the job list of the printer may be expected.

The advantages that can be obtained from the disclosed embodiments are not limited to the above-described advantages, and other advantages that have not been described above will be clearly understood from the foregoing description by those having ordinary knowledge in the art to which the present invention pertains.

The above-described embodiments are merely illustrative, and it will be understood by those having ordinary knowledge in the art to which the present invention pertains that modifications and variations may be easily made without departing from the technical spirit and essential features of the present invention. Therefore, it should be appreciated that the above-described embodiments are illustrative but are not limitative in all aspects. For example, each component which is described as being configured in a single form may be practiced in a distributed form. In the same manner, components that are described as being configured in a distributed form may be practiced in an integrated form.

The scope of the present invention is defined by the attached claims, rather than the foregoing detailed description. Furthermore, all modifications and variations derived from the meanings, scope and equivalents of the claims should be construed as falling within the scope of the present invention.

What is claimed is:

1. A method of performing print jobs in a printing system including a host device and a printing device, the method comprising:
    requesting printing while transmitting print data and identifications (IDs) corresponding to one or more print jobs, included in a job list, to the printing device;
    if an identification (ID) corresponding to at least one completed print job is received from the printing device, updating the job list by deleting a print job corresponding to the received ID from the job list;
    if an error has occurred in the printing system, determining whether the error has been resolved; and
    if the error is not resolved, repeating determination of whether the error is resolved until the error is resolved, otherwise if the error is resolved, resuming printing based on the updated job list,
    wherein resuming printing based on the updated job list comprises:
    requesting printing from the printing device while transmitting print data and an ID corresponding to at least one print job, included in the updated job list, to the printing device, or
    identifying, by the host device, an ID corresponding to at least one print job stored in a buffer of the printing device and re-updating the updated job list based on the identified ID.

2. The method of claim 1, wherein determining whether the error has been resolved comprises:
    determining that the error has occurred in the printing system if communication with the printing device fails;
    periodically attempting to access the printing device; and
    determining that the error has been resolved if the access to the printing device is successful.

3. The method of claim 2, wherein determining that the error has occurred in the printing system comprises:
    determining that the error has occurred in the printing system if data is not received from the printing device within a preset period.

4. The method of claim 1, wherein determining whether the error has been resolved comprises:
    determining that the error has occurred in the printing system if an error message is received from the printing device; and
    checking whether the error has been resolved by periodically inquiring of the printing device about whether the error has been resolved.

5. The method of claim 4, wherein the error message is a message indicating that there has occurred at least one of an error in which the printing device is out of paper, an error in which a cover of the printing device is opened, an error in which a paper jam occurs in the printing device, and an error in which power of the printing device is cut off.

6. The method of claim 1, wherein the print jobs are defined by dividing the overall print data, included in the job list, on at least one of page, document, and block bases.

7. The method of claim 1, wherein:
    the printing system further includes a relay device; and
    requesting the printing comprises:
    if the relay device receives overall print data from the host device, dividing the overall print data into a plurality of print jobs, allocating IDs to the respective print jobs, and storing resulting data in the job list; and
    requesting, by the relay device, printing while transmitting print data and IDs corresponding to one or more print jobs included in the job list to the printing device.

8. The method of claim 7, wherein the relay device is a module that is implemented inside the printing device.

9. A non-transitory computer-readable storage medium having stored thereon a computer program that, when executed by a processor, causes the processor to execute the method of claim 1.

10. A host device included in a printing system, the host device comprising:
    a communication unit configured to perform communication with a printing device;
    a storage unit configured to store a job list; and
    a control unit configured to manage the job list based on identifications (IDs) corresponding to one or more print jobs included in the job list,
    wherein the control unit requests printing while transmitting print data and IDs corresponding to one or more print jobs, included in the job list, to the printing device, updates the job list by deleting a print job corresponding to a received identification (ID) if the ID corresponding to at least one completed print job is received from the printing device, determines whether an error has been resolved if the error has occurred in the printing system, and if the error is resolved, requests printing while transmitting print data and an ID corresponding to at least one print job, included in the updated job list, to the printing device, or identifies an ID corresponding to at least one print job stored in a buffer of the printing device and re-updates the updated job list based on the identified ID, otherwise if the error is not resolved, repeats determination of whether the error is resolved until the error is resolved.

11. The host device of claim 10, wherein the control unit determines that the error has occurred in the printing system if communication with the printing device fails, periodically attempts to access the printing device, and determines that the error has been resolved if the access to the printing device is successful.

12. The host device of claim 11, wherein the control unit determines that the error has occurred in the printing system if data is not received from the printing device within a preset period.

13. The host device of claim 10, wherein the control unit determines that the error has occurred in the printing system if an error message is received from the printing device, and checks whether the error has been resolved by periodically inquiring of the printing device about whether the error has been resolved.

14. The host device of claim 13, wherein the error message is a message indicating that there has occurred at least one of an error in which the printing device is out of paper, an error in which a cover of the printing device is opened, an error in which a paper jam occurs in the printing device, and an error in which power of the printing device is cut off.

15. The host device of claim 10, wherein the print jobs are defined by dividing the overall print data, included in the job list, on at least one of page, document, and block bases.

* * * * *